United States Patent
Mohr et al.

(10) Patent No.: US 11,432,482 B2
(45) Date of Patent: Sep. 6, 2022

(54) HYDROELECTRICALLY-CHARGED AGRICULTURAL IRRIGATION PRIME MOVER, HYDROELECTRICALLY-CHARGED AGRICULTURAL HOSE REEL PRIME MOVER, AND MOBILE AGRICULTURAL IRRIGATION SYSTEM INCLUDING THE SAME

(71) Applicant: HYDROSIDE SYSTEMS LLC, Coeur D Alene, ID (US)

(72) Inventors: Dana Clifford Mohr, Coeur D Alene, ID (US); Sharon Elizabeth Mohr, Coeur D Alene, ID (US)

(73) Assignee: Hydroside Systems LLC, Coeur D Alene, ID (US)

( * ) Notice: Subject to any disclaimer, the term of this patent is extended or adjusted under 35 U.S.C. 154(b) by 258 days.

(21) Appl. No.: 16/886,539

(22) Filed: May 28, 2020

(65) Prior Publication Data

US 2020/0288654 A1    Sep. 17, 2020

Related U.S. Application Data

(63) Continuation-in-part of application No. PCT/US2019/015885, filed on Jan. 30, 2019.
(Continued)

(51) Int. Cl.
*A01G 25/09* (2006.01)
*B60L 53/00* (2019.01)
(Continued)

(52) U.S. Cl.
CPC ............ *A01G 25/097* (2013.01); *B05B 1/20* (2013.01); *B60L 1/003* (2013.01); *B60L 50/66* (2019.02); *B60L 53/00* (2019.02); *B60L 2200/40* (2013.01)

(58) Field of Classification Search
CPC .................................................. A01G 25/097
(Continued)

(56) References Cited

U.S. PATENT DOCUMENTS 3,220,654 A     11/1965  Purtell
3,984,052 A  *  10/1976  Di Palma ............ A01G 25/097
                                                          239/749
(Continued)

FOREIGN PATENT DOCUMENTS

EP    3 056 079 A1    8/2016
GB    1 557 052 A    12/1979
(Continued)

OTHER PUBLICATIONS

Search Report issued in PCT/US2019/015885, dated Apr. 25, 2019, 3 pages.
(Continued)

*Primary Examiner* — Joseph Chang
(74) *Attorney, Agent, or Firm* — Lewis Roca Rothgerber Christie LLP

(57) ABSTRACT

A hydroelectrically-charged agricultural irrigation prime mover includes: a carriage; a plurality of wheels coupled to the carriage; a fluid supply pipe configured to receive a pressurized fluid; an electric drive system; and a hydroelectric charging system. The electric drive system includes: a battery pack; and a motor electrically connected to the battery pack and configured to rotate at least some of the wheels. The hydroelectric charging system includes: a turbine fluidly connected to the fluid supply pipe to receive at least some of the pressurized fluid; and a hydroelectric generator connected to the turbine and configured to charge the battery pack.

19 Claims, 19 Drawing Sheets

Related U.S. Application Data

(60) Provisional application No. 62/625,568, filed on Feb. 2, 2018.

(51) Int. Cl.
*B60L 50/60* (2019.01)
*B05B 1/20* (2006.01)
*B60L 1/00* (2006.01)

(58) Field of Classification Search
USPC ........................................................ 239/736
See application file for complete search history.

(56) References Cited

U.S. PATENT DOCUMENTS

| | | |
|---|---|---|
| 4,378,089 A | 3/1983 | Wilken et al. |
| 6,889,922 B1 | 5/2005 | Knight et al. |
| 9,877,439 B1 * | 1/2018 | McHugh ................ A01G 25/02 |
| 2016/0235019 A1 | 8/2016 | Manghi |

FOREIGN PATENT DOCUMENTS

| | | |
|---|---|---|
| GB | 1557052 | 12/1979 |
| GB | 2 462 720 A | 2/2010 |
| WO | WO 2007/027103 A1 | 3/2007 |

OTHER PUBLICATIONS

International Preliminary Report on Patentability issued in PCT/US2019/015885, dated Mar. 19, 2020, 20 pages.

International Search Report issued in PCT/US2020/035003, dated Feb. 11, 2021, 4 pages.

Written Opinion issued in PCT/US2020/035003, dated Feb. 11, 2021, 8 pages.

\* cited by examiner

HYDROELECTRICALLY-CHARGED AGRICULTURAL IRRIGATION PRIME MOVER, HYDROELECTRICALLY-CHARGED AGRICULTURAL HOSE REEL PRIME MOVER, AND MOBILE AGRICULTURAL IRRIGATION SYSTEM INCLUDING THE SAME

CROSS-REFERENCE TO RELATED APPLICATIONS

This utility patent application is a continuation-in-part of PCT Patent Application No. PCT/US2019/015885, filed Jan. 30, 2019, which claims priority to and the benefit of U.S. Provisional Patent Application Ser. No. 62/625,568, filed Feb. 2, 2018, the entire contents of both of which are incorporated herein by reference.

BACKGROUND

1. Field

Aspects of example embodiments of the present disclosure relate to a hydroelectrically-charged agricultural irrigation prime mover, a hydroelectrically-charged agricultural irrigation hose reel prime mover, and a mobile agricultural irrigation system including the prime mover and/or the hose reel prime mover.

2. Related Art

As the world's population increases and arable land decreases due to, for example, climate change and population growth, farmers are under increasing pressure to improve crop yields, that is, to increase the amount of food (e.g., corn, soybeans, etc.) harvested per acre, while also reducing costs. These pressures have caused farmers to increasingly rely on automation to reduce the number of workers required per acre while also ensuring efficient use of the relatively expensive farm equipment, such as tractors, irrigation systems, etc. and efficient use of resources, such as water.

One method of increasing crop yield is irrigation. Irrigation is the practice of artificially supplying farmland with water to promote crop growth. When irrigating a field, it is important to ensure that the crops are not under-irrigated, which can result in crop die off or delayed or reduced crop yield, or over-irrigated, which can also result in crop die off and also wastes water and energy.

Different agricultural irrigation systems may be used, including permanent or semi-permanent sprinkler irrigation systems, center pivot irrigation systems, and traveling irrigation systems. Of these irrigation systems, traveling irrigation systems provide an attractive combination of relatively low initial investment and flexibility. Unlike the permanent or semi-permanent sprinkler irrigation systems and the center pivot irrigation system, all of which are relatively immobile, traveling irrigation systems are mobile, such that one traveling irrigation system can cover a relatively large field and can be moved between different fields, making such systems economical.

Of the traveling irrigation systems, wheel-line irrigation systems (also referred to as "side rolls") generally include a relatively rigid water supply pipe with a plurality of sprinklers and wheels arranged at regular intervals along the water supply pipe. The water supply pipe is relatively rigid because it acts as an axle for the wheels, and the wheels support the water supply pipe. The wheels may be fixedly mounted to the water supply pipe to rotate along with the water supply pipe. The water supply pipe has a diameter in a range of about four inches to about five inches and may have an overall length of about an eighth of a mile to a quarter mile or longer. The wheels may have a diameter of about five feet to about ten feet and may be spaced apart from each other by about 30 feet to about 40 feet.

Typically, a prime mover (e.g., a power mover) is positioned at or near the center of the water supply pipe to move the wheel-line across a field between irrigation sets, that is, between different areas of the field to be irrigated. Prime movers for wheel-lines generally include an internal combustion engine (e.g., a gasoline engine) that spins the water supply pipe, thereby causing the wheels that are fixedly mounted to the water supply pipe to rotate, causing the wheel-line to move across the field. As described further below, the prime mover is used to move the wheel-line between sets.

After the wheel-line is positioned in a field, a worker connects the water supply pipe to a mainline water outlet via a flexible hose. Generally, the mainline water outlets are connected to fixed (e.g., rigid) water lines that are permanent or semi-permanent fixtures in the field. Then, a valve at the mainline water outlet is opened to provide pressurized water to the water supply pipe of the wheel-line via the flexible hose. After an amount of time has passed and the portion of the field under and around the wheel-line (a "set") is sufficiently irrigated, the wheel-line is moved to another portion of the field (another "set") and the process is repeated. Generally, mainline water outlets are arranged about every 50 to 60 feet across a field.

To move the wheel-line, a worker closes the valve at the mainline water outlet, drains the water supply pipe, engages the prime mover to move the water-line to the next mainline water outlet, connects the water supply pipe to the next mainline water outlet via the flexible hose, and re-energizes the water supply pipe with pressurized water to irrigate the new area of the field (e.g., the next set).

When the wheel-line reaches the end of the field and completes the final set, the worker disconnects the wheel-line from the mainline water outlet, moves the wheel-line back across the entire length of the field or to another field, and begins the process again.

Other types of traveling irrigation systems include traveling gun irrigation systems and water-reel irrigation systems. These systems generally include one or more large sprinklers on a cart (e.g., a mobile cart). The cart is attached to a water supply hose, and the water supply hose is spooled on a hose reel. Generally, the hose reel is moved to one end of a traveling lane in a field, and the cart is then pulled to the other end of the traveling lane by, for example, a tractor while the hose reel remains in place and the water supply hose spools out. Then, the water supply hose is energized and pressurized water flows through the water supply hose to the sprinkler. While the pressurized water exits the sprinkler, the hose reel turns by an internal combustion engine or directly by water pressure, thereby winding up (e.g., retracting) the water supply hose and slowly moving (or pulling) the cart back down the traveling lane toward the hose reel, which remains stationary while the cart moves along the traveling lane. In some cases, the cart may be extended about a quarter-mile or more down the traveling lane from the hose reel. By this method, the traveling gun and water-reel can irrigate a relatively large field (or a relatively large portion of a field) by moving along traveling lanes in the field as they irrigate.

However, after the traveling gun and/or water-reel complete a pass, that is, completes a return trip down a traveling lane, a worker is generally required to attend to the traveling gun or water-reel by de-energizing the water supply hose, moving the cart and water-reel to another traveling lane by, for example, a tractor, pulling the cart to the end of the next traveling lane, and then re-energizing the water supply hose. Depending on the length of the traveling lanes, this process may be repeated multiple times a day.

Farms often employ a plurality of the above-described irrigation systems, thereby necessitating one or more dedicated workers to continuously monitor, move, and re-set the traveling irrigation systems.

SUMMARY

The present disclosure is directed toward various embodiments of a hydroelectrically-charged agricultural irrigation prime mover, a hydroelectrically-charged agricultural irrigation hose reel prime mover, and a mobile agricultural irrigation system including the prime mover and/or the hose reel prime mover.

According to an embodiment of the present disclosure, a hydroelectrically-charged agricultural irrigation prime mover includes: a carriage; a plurality of wheels coupled to the carriage; a fluid supply pipe configured to receive a pressurized fluid; an electric drive system; and a hydroelectric charging system. The electric drive system includes: a battery pack; and a motor electrically connected to the battery pack and configured to rotate at least some of the wheels. The hydroelectric charging system includes: a turbine fluidly connected to the fluid supply pipe to receive at least some of the pressurized fluid; and a hydroelectric generator connected to the turbine and configured to charge the battery pack.

The motor may be configured to rotate the fluid supply pipe.

The turbine may be an in-line turbine.

The hydroelectrically-charged agricultural irrigation prime mover may further include a steering axle and a non-steering axle. Each of the steering axle and the non-steering axle may have a plurality of the wheels connected thereto.

The motor may be configured to simultaneously rotate the fluid supply pipe and the non-steering axle.

The hydroelectrically-charged agricultural irrigation prime mover may further include a hose reel rotatably connected to the carriage.

The hydroelectrically-charged agricultural irrigation prime mover may further include a second motor electrically connected to the battery pack. The second motor may be configured to rotate the hose reel.

The hydroelectrically-charged agricultural irrigation prime mover may further include a flexible hose on the hose reel. The carriage may have an opening therein through which one end of the flexible hose passes.

The hydroelectrically-charged agricultural irrigation prime mover may further include a hose director configured to move back-and-forth across the opening in the carriage and to direct the flexible hose through the opening.

The hydroelectrically-charged agricultural irrigation prime mover may further include a linear actuator to move the hose director.

The hydroelectrically-charged agricultural irrigation prime mover may further include a double-acting cylinder to move the hose director.

The turbine may be above the hose reel with respect to the carriage.

The hydroelectrically-charged agricultural irrigation prime mover may further include a nozzle connected to an outlet of the turbine.

The hydroelectrically-charged agricultural irrigation prime mover may further include a fitting connected to an outlet of the turbine.

According to an embodiment of the present disclosure, a mobile agricultural irrigation system includes: a water supply pipe including a plurality of wheels and sprinklers arranged along a length of the water supply pipe; and a hose reel prime mover connected to a proximal end of the water supply pipe. The hose reel prime mover includes an electric drive system and a hydroelectric charging system. The electric drive system includes a battery pack and a first motor electrically connected to the battery pack. The first motor is configured to move the hose reel prime mover. The hydroelectric charging system includes a turbine configured to be powered by a pressurized fluid and a hydroelectric generator powered by the turbine and configured to charge the battery pack.

The hose reel prime mover may further include a hose reel on which a flexible hose is arranged. The electric drive system of the hose reel prime mover may further include a second motor electrically connected to the battery pack and configured to rotate the hose reel.

The hose reel prime mover may further include a hose director configured to move back-and-forth to direct the flexible hose onto and off of the hose reel.

The hose reel prime mover may further include a third motor electrically connected to the battery pack and configured to move the hose director.

The hose reel prime mover may further include a controller, and the controller may be configured to control a rotational speed of the hose reel in coordination with a movement speed of the hose director and a movement speed of the hose reel prime mover.

The mobile agricultural irrigation system may further include a second prime mover connected along the water supply pipe at a distance from the hose reel prime mover and at a distance from a distal end of the water supply pipe. The second prime mover may include an electric drive system and a hydroelectric charging system configured to power the electric drive system.

DETAILED DESCRIPTION

Figure 1:
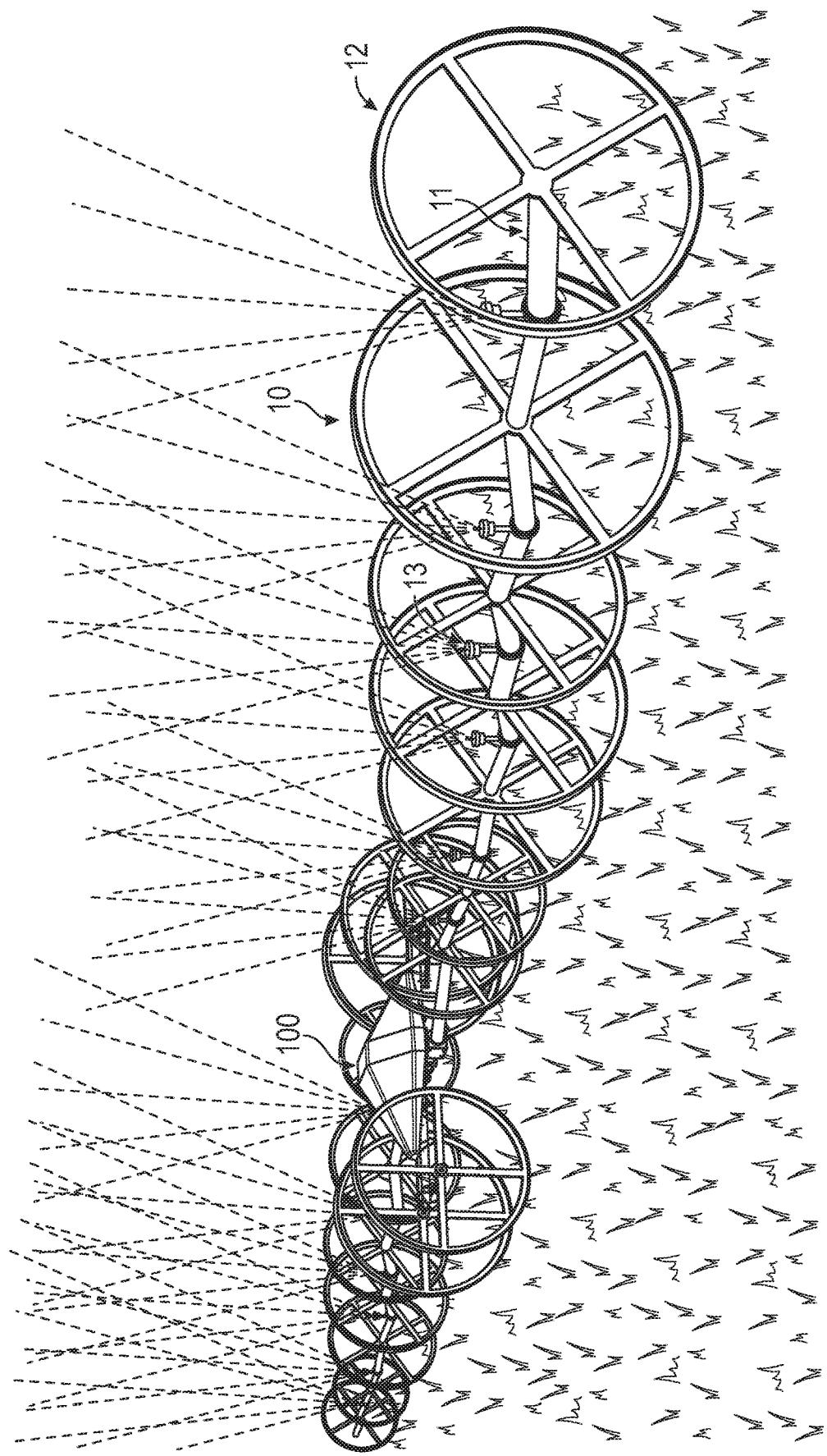
FIG. 1 is a schematic illustration of a mobile agricultural irrigation system according to an embodiment of the present disclosure.
Figure 2:
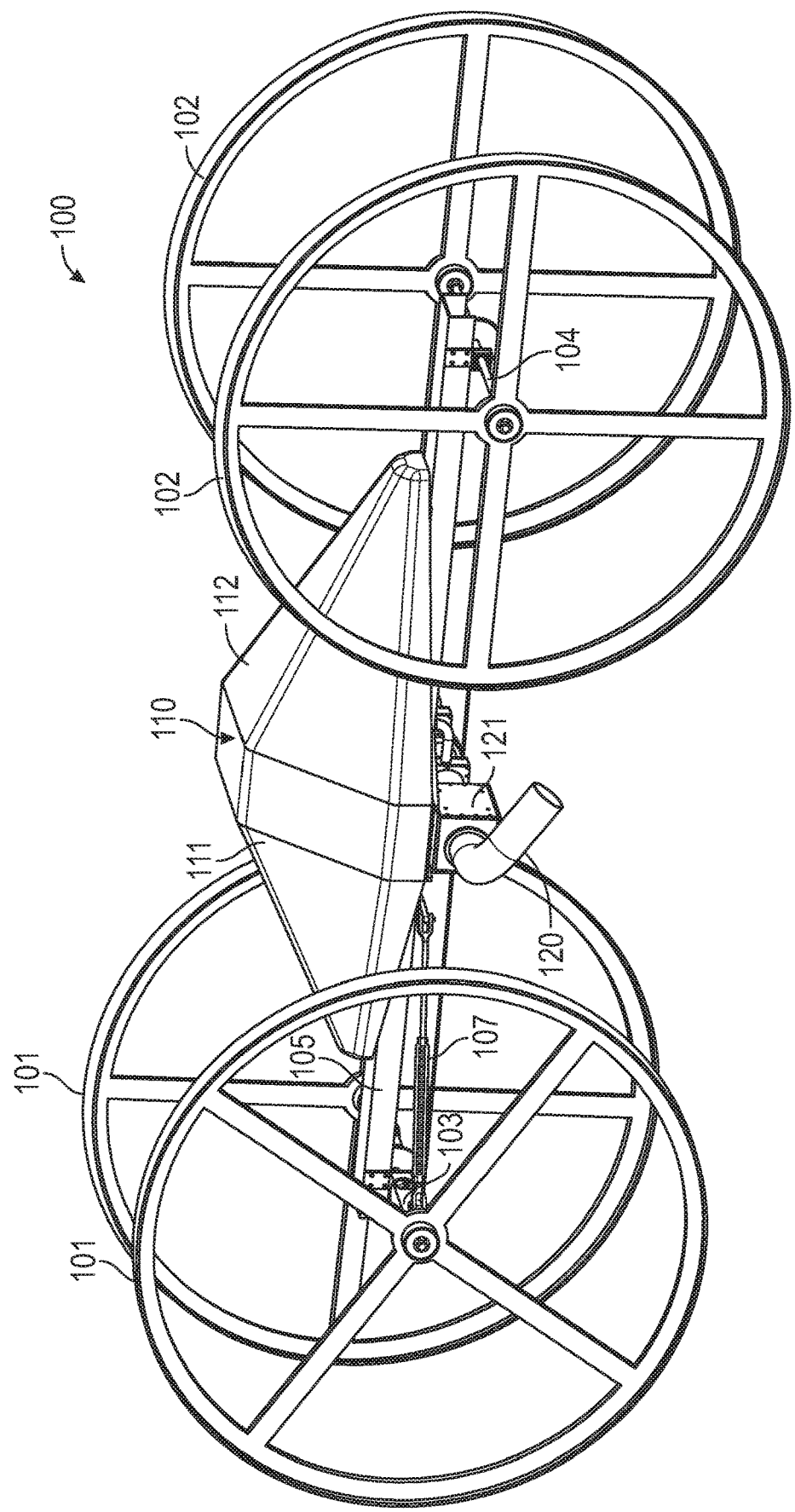
FIG. 2 is a schematic illustration of a hydroelectrically-charged agricultural irrigation prime mover of the mobile agricultural irrigation system shown in FIG. 1.
Figure 3:
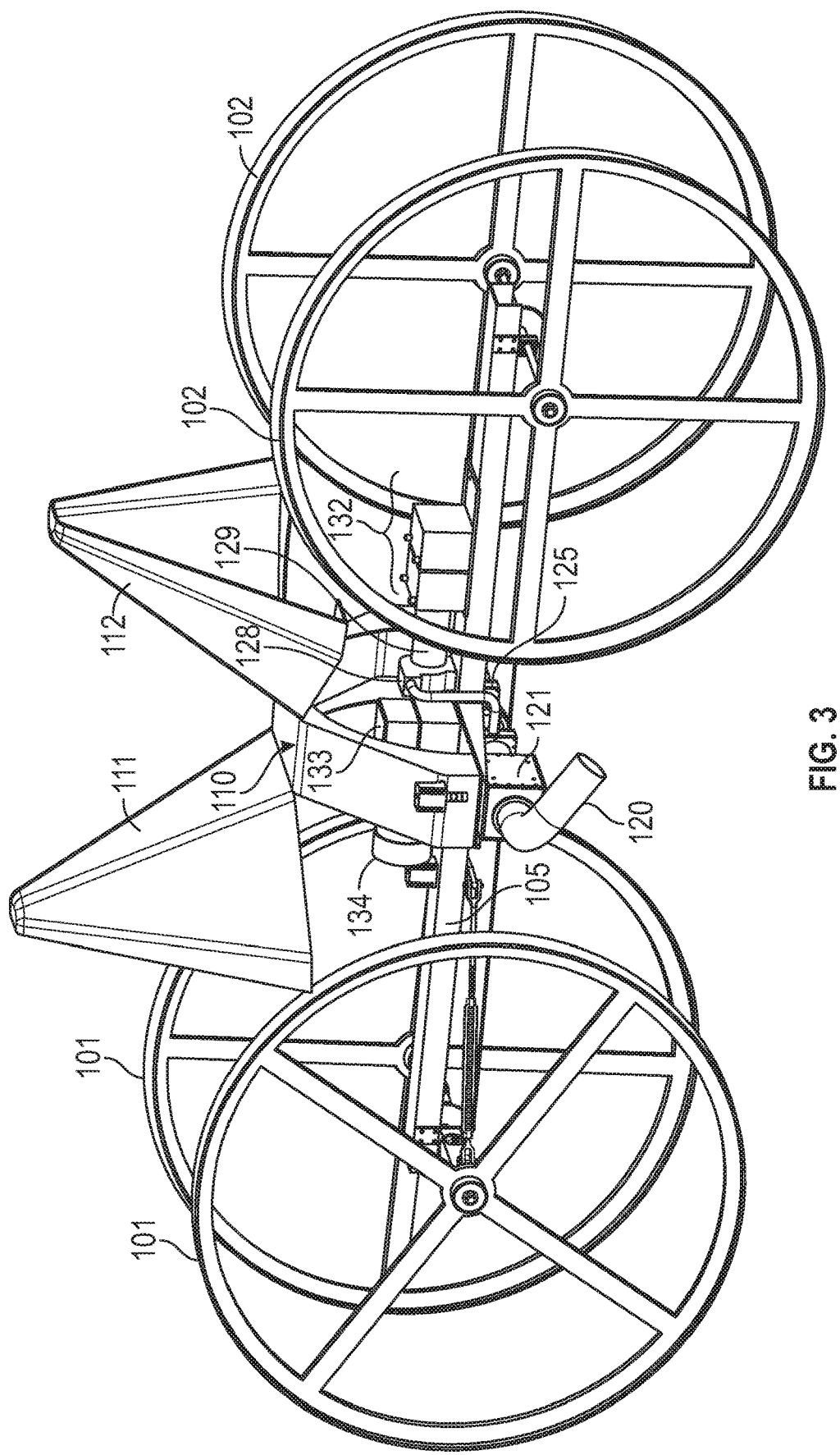
FIG. 3 shows the hydroelectrically-charged agricultural irrigation prime mover shown in FIG. 2 with a raised cover.
Figure 4:
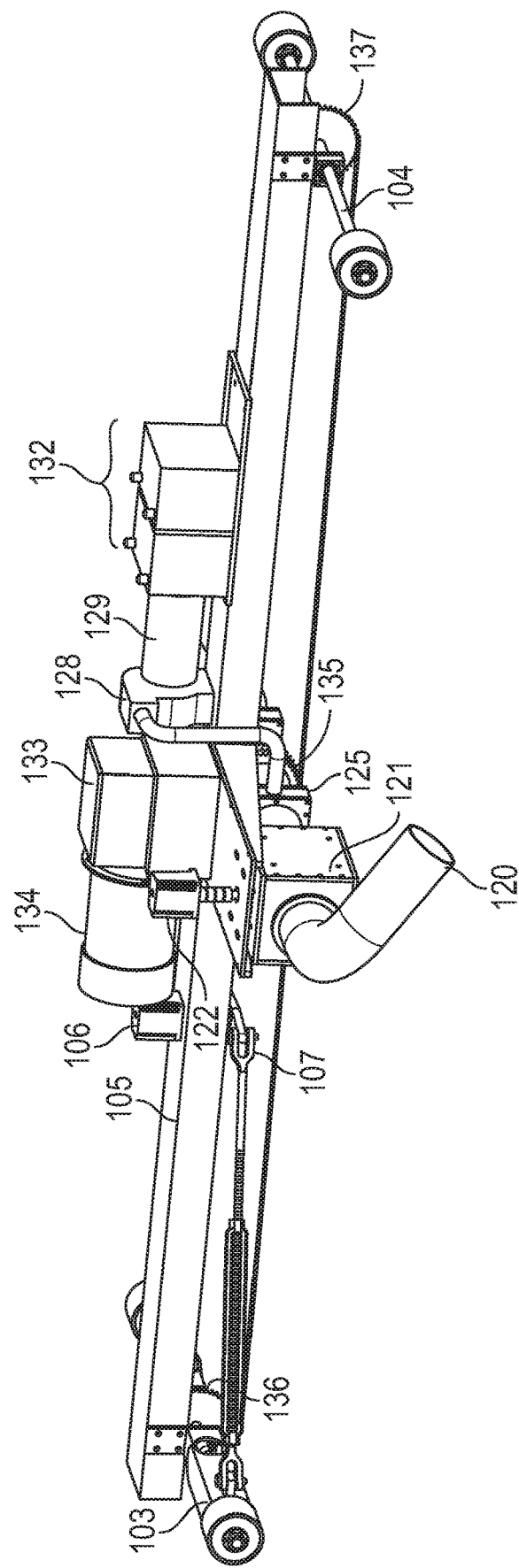
FIG. 4 shows a drivetrain of the hydroelectrically-charged agricultural irrigation prime mover shown in FIG. 2.
Figure 5:
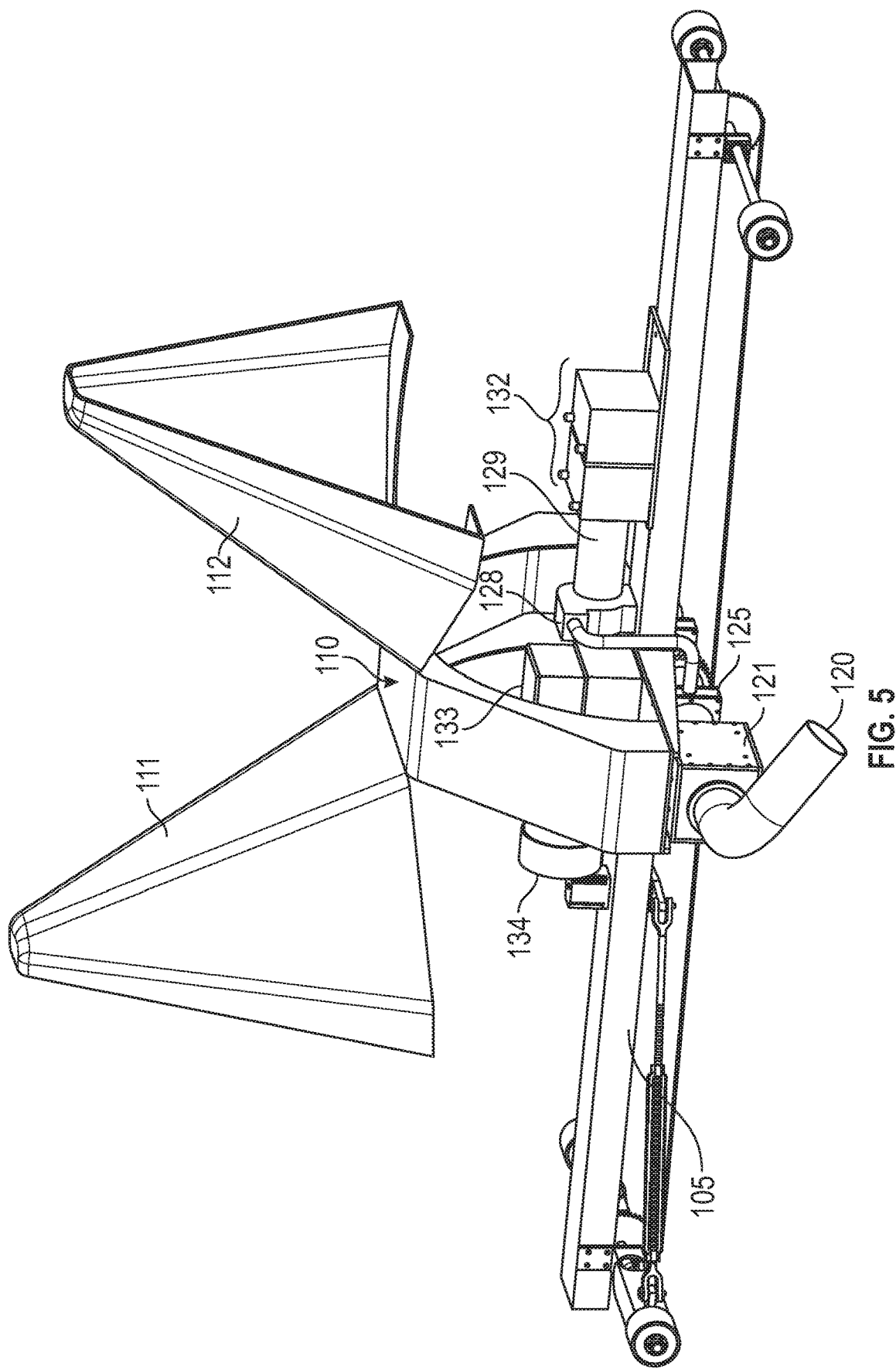
FIG. 5 shows the drivetrain of the hydroelectrically-charged agricultural irrigation prime mover shown in FIG. 2 with the cover attached thereto.

The present disclosure is directed toward various embodiments of a hydroelectrically-charged agricultural irrigation prime mover, a hydroelectrically-charged agricultural irrigation hose reel prime mover, and a mobile agricultural irrigation system including the prime mover and/or the hose reel prime mover. According to embodiments of the present disclosure, a hydroelectrically-charged agricultural irrigation prime mover and the hydroelectrically-charged agricultural irrigation hose reel prime mover include an electric drivetrain powered by a hydroelectrically-charged battery pack. The battery pack may be charged by using pressurized water used to irrigate a field, thereby allowing the prime movers to operate relatively independently of any outside intervention by, for example, not requiring any gasoline or solar power to operate.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, and/or layers, these elements, components, and/or layers should not be limited by these terms. These terms are used to distinguish one element, component, or layer from another element, component, or layer. Thus, a first element, component, or layer described below could be termed a second element, component, or layer without departing from the scope of the present disclosure.

It will be understood that when an element or component is referred to as being "connected to" or "coupled to" another element or component, it may be directly connected or coupled to the other element or component or one or more intervening elements or components may also be present. When an element or component is referred to as being "directly connected to" or "directly coupled to" another element or component, there are no intervening element or component present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The controller, transceiver, battery management system, and/or any other relevant devices or components according to embodiments of the present disclosure described herein may be implemented utilizing any suitable hardware (e.g., an application-specific integrated circuit), firmware, software, and/or a suitable combination of software, firmware, and hardware. For example, the various components of the controller, transceiver, and/or battery management system may be formed on (or realized in) one integrated circuit (IC) chip or on separate IC chips. Further, the various components of the controller, transceiver, and/or battery management system may be implemented on a flexible printed circuit film, a tape carrier package (TCP), a printed circuit board (PCB), etc. Further, the described actions may be processes or threads, running on one or more processors (e.g., one or more CPUs, GPUs, etc.), in one or more computing devices, executing computer program instructions and interacting with other system components to perform the various functionalities described herein. The computer program instructions may be stored in a memory, which may be implemented in a computing device using a standard memory device, such as, for example, a random access memory (RAM). The computer program instructions may also be stored in other non-transitory computer readable media such as, for example, a CD-ROM, flash drive, HDD, SSD, or the like. Also, a person of skill in the art should recognize that the functionality of various computing devices may be combined or integrated into a single computing device or the functionality of a particular computing device may be distributed across one or more other computing devices without departing from the scope of the embodiments of the present disclosure.

Referring to FIG. 1, a mobile agricultural irrigation system 10 according to an embodiment of the present disclosure is illustrated. The mobile agricultural irrigation system 10 shown in FIG. 1 is embodied as a wheel-line irrigation system, but the present disclosure is not limited thereto. For example, in other embodiments, the mobile agricultural irrigation system 10 may be embodied as a traveling gun irrigation system, a water-reel irrigation system, a traveling boom irrigation system, water-reel irrigation system and/or a linear line irrigation system.

The mobile agricultural irrigation system 10 includes a water supply pipe (e.g., a fluid supply pipe) 11 configured to receive a pressurized water (e.g., a pressurized fluid), a plurality of wheels 12 arranged at intervals along and fixedly mounted to the water supply pipe 11, a plurality of sprinklers 13 arranged at intervals along the water supply pipe 11, and a hydroelectrically-charged agricultural irrigation prime mover 100 (also referred to herein as the "prime mover 100") connected to the water supply pipe 11. The water supply pipe 11 supplies water to the field via the sprinklers 13. Although the prime mover 100 is shown as being at an approximate center of the water supply pipe 11 in FIG. 1, the present disclosure is not limited thereto. In other embodiments, the mobile agricultural irrigation system 10 may include a plurality of the prime movers 100, with the prime movers 100 being positioned at opposite ends of the water supply pipe 11. By providing the prime movers 100 at the opposite ends of the water supply pipe 11, the mobile agricultural irrigation system 10 may be more accurately positioned in the field.

Referring to FIGS. 2-7, the hydroelectrically-charged agricultural irrigation prime mover 100 is shown in more detail. As discussed above, the prime mover 100 may be used with, as a few examples, wheel-line irrigation systems, water-reel irrigation systems, traveling gun irrigation systems, traveling boom irrigation systems, and linear line irrigation systems. While the prime mover 100 is shown as being used with a wheel-line irrigation system, aspects and features of the prime mover 100 will be understood by one of ordinary skill in the art as being applicable to water-reel irrigation systems, traveling gun irrigation systems, and traveling boom irrigation systems. Put another way, the aspects and features of the present disclosure are not limited to a prime mover for a wheel-line irrigation system, and embodiments of the present disclosure directed to water-reel and other traveling irrigation systems are contemplated herein.

The prime mover 100 may include a carriage (e.g., a U-shaped carriage or support) 105 extending between and supported by a plurality of (e.g., a pair of) steering wheels 101 and a plurality of (e.g., a pair of) non-steering wheels 102. As will be discussed further below, the steering and non-steering wheels 101/102 may both be (or may all be) driven wheels. For example, all of the wheels 101/102 of the prime mover 100 may be driven (or powered) wheels.

The steering wheels 101 may be connected to each other by a steering axle 103, and the non-steering wheels 102 may be connected to each other by a non-steering axle 104. The steering axle 103 may be pivotably connected to the carriage 105, and the non-steering axle 104 may be non-pivotably mounted to the carriage 105. Bearings may be used between the carriage 105 and the axles 103/104 to permit the axles 103/104 to spin (or rotate) relative to the carriage 105.

The prime mover 100 may further include a steering box (e.g., a steering motor and gearbox) 106 configured to pivot the steering axle 103 and, thereby, steer the prime mover 100. A steering shaft 107 may extend between and connect the steering box 106 to the steering axle 103.

In other embodiments, the prime mover 100 may have all-wheel steering. For example, in other embodiments, a second steering box may be included to pivot the other axle 104. In this way, the turning radius of the prime mover 100 may be improved over the embodiment which has only a single steering axle 103.

The prime mover 100 includes a cover 110 covering (or substantially covering) a hydroelectric charging system and an electric drive system (e.g., drivetrain), the hydroelectric charging system being configured to power (e.g., charge) the electric drive system. The cover 110 may have two halves 111/112 that may be opened and/or closed independently from each other to inspect and/or service the electric drive system and the hydroelectric charging system.

The hydroelectric charging system may include a water supply pipe (e.g., a fluid supply pipe) 120, which has an inlet portion 123 and an outlet portion 124, a shut-off valve 121 and shut-off valve motor 122 configured to control the shut-off valve 121, an inlet junction box 125 at the inlet portion 123 of the water supply pipe 120, a turbine inlet hose 127, a turbine 128 and hydroelectric generator 129, a turbine outlet hose 130, and an outlet junction box 131 at the outlet portion 124 of the water supply pipe 120. The hydroelectric generator 129 may be powered by the turbine 128 to charge a battery pack 132, and the battery pack 132 may power a motor 133 and gearbox 134 of the electric drive system, which is further described below.

Although the hydroelectric charging system is shown to receive water flow from the right side of the prime mover 100 (e.g., the right side when viewing toward the non-steering axle 104), relevant components of the hydroelectric charging system may be reversed in other embodiments to accommodate water flow from the left side of the prime mover 100. In some embodiments, the prime mover 100 may operate bi-directionally. For example, the prime mover 100 may move with the steering axle 103 or the non-steering axle 104 in front, such that the components of the hydroelectric charging system do not need to be moved or changed to accommodate water flow from another side of the prime mover 100.

The turbine 128 is illustrated as being a radial flow turbine in which the water flows through the turbine in a direction perpendicular to the axis of rotation of an output shaft that turns (e.g., powers) the hydroelectric generator 129. The hydroelectric charging system is not limited to using a radial flow turbine, however, and may use an axial flow turbine (e.g., an in-line turbine) or a spiral flow turbine.

The electric drive system may include the battery pack 132, the motor 133 electrically connected to the battery pack 132, and the gearbox 134. The gearbox 134 is connected to the motor 133 and the sprockets 135. In some embodiments, the gearbox 134 may be a plurality of sprockets, including the sprocket 135. In other embodiments, the gearbox 134 may be omitted and a direct-drive system employed.

The prime mover 100 may also include a controller to control the electric drive system, the hydroelectric charging system, and/or the steering box 106. The controller may also be powered by the battery pack 132. In other embodiments, the controller may be separate from the motor 133 and/or may be powered by an independent power supply.

The controller may also include (or may communicate with) a transceiver configured for two-way wireless radio communication. As will be discussed further below, by using the transceiver, the prime mover 100 may report its position, current operating status, state of charge of the battery pack 132, etc. to a central operating platform, thereby enabling one worker or a central controller to remotely monitor and/or control a plurality of the prime movers 100.

The battery pack 132 may include a plurality of individual battery cells connected to each other in series and/or in parallel. In some embodiments, the battery pack 132 may include three battery cells, each operating at 12 volts, connected to each other in series, such that the battery pack 132 provides 36 volts to the motor 133. In the illustrated embodiment, only two battery cells are shown so that a battery tray, on which the battery cells are arranged, is visible. Nevertheless, the present disclosure is not limited thereto, and the battery pack 132 may include any suitable number of battery cells connected to each other in series and/or in parallel to provide increased voltage and/or increased power. The battery pack 132 may further include, for example, a battery management system (BMS) to monitor a state of charge (SoC) of the battery cells, for enabling and disabling charging of the battery cells, and/or for charge leveling among the battery cells. In other embodiments, one or more super capacitors may be used in place of the battery pack 132.

The gearbox 134 may be driven by the motor 133 and may drive the water supply pipe 120 and both the steering axle 103 and the non-steering axle 104 by, for example, a chain drive system including a plurality of sprockets or a belt drive system including a plurality of pulleys. In the illustrated embodiment, the gearbox 134 drives a chain drive system, which includes three sprockets 135 fixedly mounted to the water supply pipe 120 under the carriage 105. From among the three sprockets 135, one sprocket is driven by the gearbox 134 and the other two sprockets may respectively drive the first and second driven sprockets 136/137, which drive the axles 103/104, respectively.

When the prime mover 100 is commanded to move, the motor 133, which is powered by energy stored in the battery pack 132, rotates an output shaft which turns the gearbox 134. The gearbox 134 then rotates one of the sprockets 135, which rotates the water supply pipe 120 and the other two sprockets 135. By rotating the water supply pipe 120, the other wheels mounted to the water supply pipe 120 rotate. Further, the other two sprockets 135 drive the sprockets 136/137, thereby driving the wheels 101/102 and moving the prime mover 100. In this manner, the prime mover 100 and the mobile agricultural irrigation system 10 move together.

Figure 6:
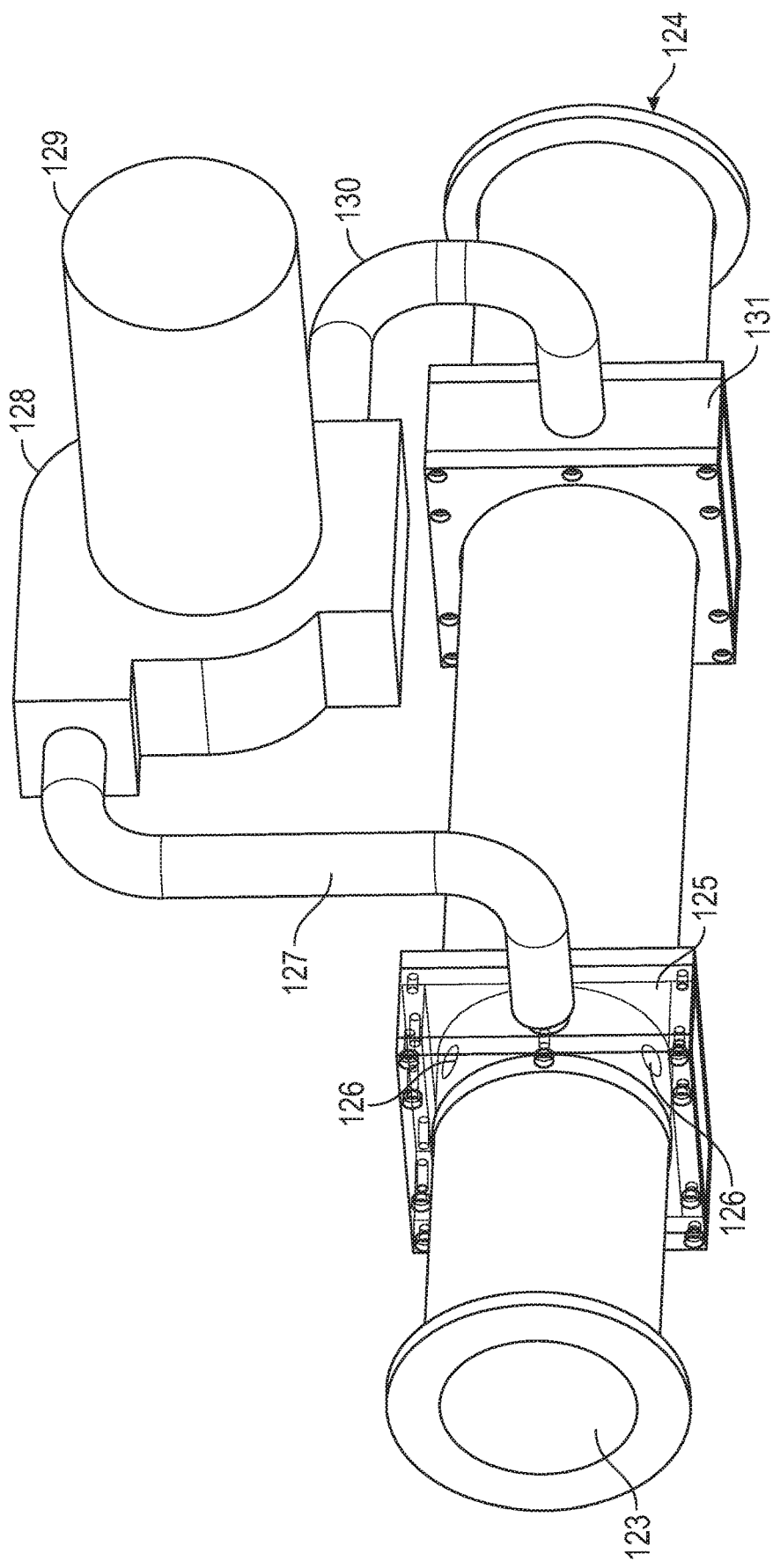
FIGS. 6 and 7 show a portion of the drivetrain of the hydroelectrically-charged agricultural irrigation prime mover shown in FIGS. 4 and 5.
Figure 7:
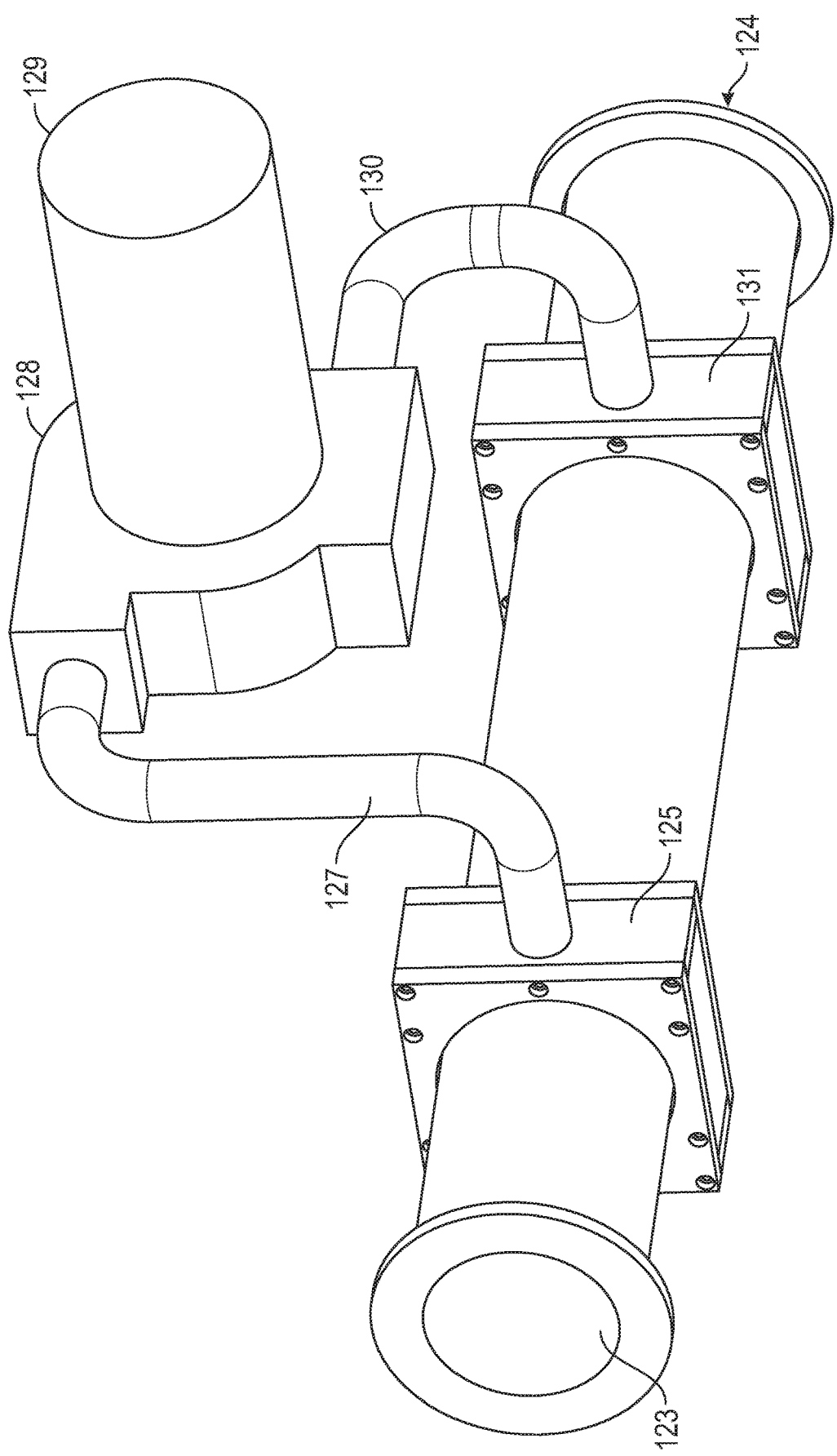

Hereinafter, referring to FIGS. 6 and 7, the hydroelectric charging system will be described in more detail. First, pressurized water from a mainline water outlet enters the water supply pipe 120 of the prime mover 100. The water may be pressurized from about 45 to about 120 pounds-per-square inch (psi). The water supply pipe 120 may have a diameter of about four to about five inches, but the present disclosure is not limited thereto. Further, the water supply pipe 120 may be pivotably connected to the prime mover 100, including being pivotably connected to the shut-off valve 121, the inlet junction box 125, and the outlet junction box 131, such that the water supply pipe 120 may pivot or rotate relative to the prime mover 100.

When the shut-off valve 121 is open, the pressurized water passes through the shut-off valve 121 and into the inlet portion 123 of the water supply pipe 120. The inlet junction box 125 surrounds a circumference of the inlet portion 123 of the water supply pipe 120, and a plurality of openings (e.g., holes) 126 are formed in the portion of the water supply pipe 120 surrounded and sealed by the inlet junction box 125 (e.g., a perforated portion of an exterior surface of the inlet portion 123 of the water supply pipe 120 is surrounded and fluidly sealed by the inlet junction box 125). Because the water supply pipe 120 rotates relative to the prime mover 100, the inlet junction box 125 may include gaskets, such as O-rings, fluidly sealing the pressurized water between the exterior surface of the water supply pipe 120 and the inlet junction box 125.

The openings 126 in the inlet portion 123 of the water supply pipe 120 allow a portion of the pressurized water to escape from the water supply pipe 120 into the inlet junction box 125, and the pressurized water in the inlet junction box 125 may be passed into the turbine 128 via the turbine inlet hose 127. Again, because the water supply pipe 120 rotates relative to the prime mover 100, the inlet junction box 125 allows for pressurized water to move from the water supply pipe 120 to the turbine 128 without the turbine inlet hose 127 being fixed to the rotatable water supply pipe 120. Also, because the flowrate of pressurized water in the water supply pipe 120 is relatively high as it is intended to irrigate a field, introducing the entire flowrate of pressurized water from the water supply pipe 120 into the turbine 128 may damage the turbine 128 and may reduce the water pressure to the portion of the water supply pipe 120 beyond the prime mover 100, thereby causing uneven irrigation of the field. By using the inlet junction box 125 and the perforated inlet portion 123 of the water supply pipe 120, only a portion of the pressurized water is diverted from the water supply pipe 120 to the turbine 128, thereby increasing the lifespan of the turbine 128 and mitigating any reduction in water pressure in the portion of the water supply pipe 120 beyond the prime mover 100.

As the water moves into the turbine 128 via the turbine inlet hose 127, the water contacts and moves a plurality of blades of a turbine runner in the turbine 128, causing the turbine runner to spin. The spinning turbine runner spins a driveshaft, which spins a rotor of the hydroelectric generator 129 within a stator. By spinning the rotor within the stator, an electrical current is generated by the hydroelectric generator 129, and the electrical current is output to the battery pack 132. The electrical current generated by the hydroelectric generator 129 may be used to charge the battery pack 132 while the pressurized water flows through the water supply pipe 120 to irrigate the field.

As the pressurized water exits the turbine 128, it flows through the turbine outlet hose 130 and into the outlet portion 124 of the water supply pipe 120 at the outlet junction box 131. Similar to the perforated inlet portion 123 of the water supply pipe 120 at the inlet junction box 125, the outlet portion 124 of the water supply pipe 120 is surrounded and sealed by the outlet junction box 131 and has a plurality of openings (e.g., holes) therein to allow the pressurized water exhausted from the turbine 128 to re-enter the water supply pipe 120. Thus, the water supply pipe 120 may have two perforated portions, one at the inlet portion 123 where the inlet junction box 125 is arranged and another at the outlet portion 124 where the outlet junction box 131 is arranged. Further, the openings (e.g., the perforations) in perforated outlet portion 124 of the water supply pipe 120 may be configured to induce a Venturi effect to provide a scavenging effect to reduce the backpressure on the turbine 128. For example, the perforations in the perforated outlet portion 124 of the water supply pipe 120 at the outlet junction box 131 may be formed as an orifice plate to increase the velocity and reduce the fluid pressure of the water exhausted from the turbine 128 as it returns to the water supply pipe 120 due to, at least in part, the reduced pressure of the water entering the outlet junction box 131 after having exited the turbine 128 compared to the pressure of the water in the water supply pipe 120.

In some embodiments, an inlet valve may be provided at the inlet of the turbine 128. In such an embodiment, when the controller determines that the state of charge (SoC) of the battery pack 132 is below a threshold, the inlet valve may be opened to allow the pressurized water to pass through the turbine 128 such that the hydroelectric generator 129 charges the battery pack 132. And when the controller determines that the SoC of the battery pack 132 is above the threshold, the inlet valve may be closed to prevent pressurized water from passing through the turbine 128, thereby preventing the battery pack 132 from being overcharged and reducing wear on the other components of the hydroelectric charging system.

When the mobile agricultural irrigation system 10, which includes the prime mover 100, is ready to be moved across the field, the shut-off valve 121 may be closed by the shut-off valve motor 111 and the pressurized water may be drained from the water supply pipe 120. The shut-off valve 121 may be closed manually, such as by a worker in the field, remotely by a command received via the transceiver, or automatically (or autonomously) by the controller. Then, the electric drive system of the prime mover 100 may be activated to move the prime mover 100 and the mobile agricultural irrigation system 10. For example, the motor 133 may be activated manually, remotely by a command received via the transceiver, or automatically (or autonomously) by the controller to drive the prime mover 100 and the mobile agricultural irrigation system 10 by using the energy stored in the battery pack 132. In some embodiments, the prime mover 100 may be remotely controlled and/or may be autonomous, such that the controller may (e.g., may automatically or autonomously) close the shut-off valve 121, wait an amount of time for the pressurized water to drain from the water supply pipe 120 or wait until a drop of pressure in the water supply pipe 120 below a threshold is sensed by a pressure sensor or the like, activate the motor 133 to move the prime mover 100 and the mobile agricultural irrigation system 10 a distance (e.g., a set distance) across the field, and then open the shut-off valve 121 to resume irrigation and to charge the battery pack 132. In some embodiments, the distance may correspond to a distance between mainline water outlets in the field, such as about 50 or 60 feet. In other embodiments, the controller may include a positioning system, such as a satellite-based positioning system (e.g., GPS, GLONASS, etc.) and may use positioning information obtained from the positioning system to move itself across the field. For example, the controller may store a number of waypoints in a field and may use the position determined by the positioning system to move between the waypoints.

In embodiments in which the mobile agricultural irrigation system 10 includes a plurality of the prime movers 100, such as one prime mover 100 at each end of the water supply pipe 120, one of the prime movers 100 may be a primary and the other prime mover 100 may be a slave to the primary prime mover 100. In such an embodiment, the controller of the primary prime mover 100 may control the controller of the slave prime mover 100 by using the transceivers. For example, the primary prime mover 100 may command the slave prime mover 100 to move when it does, in the same direction, and for the same amount of time, to ensure that the mobile agricultural irrigation system 10 remains straight in the field.

Figure 8:
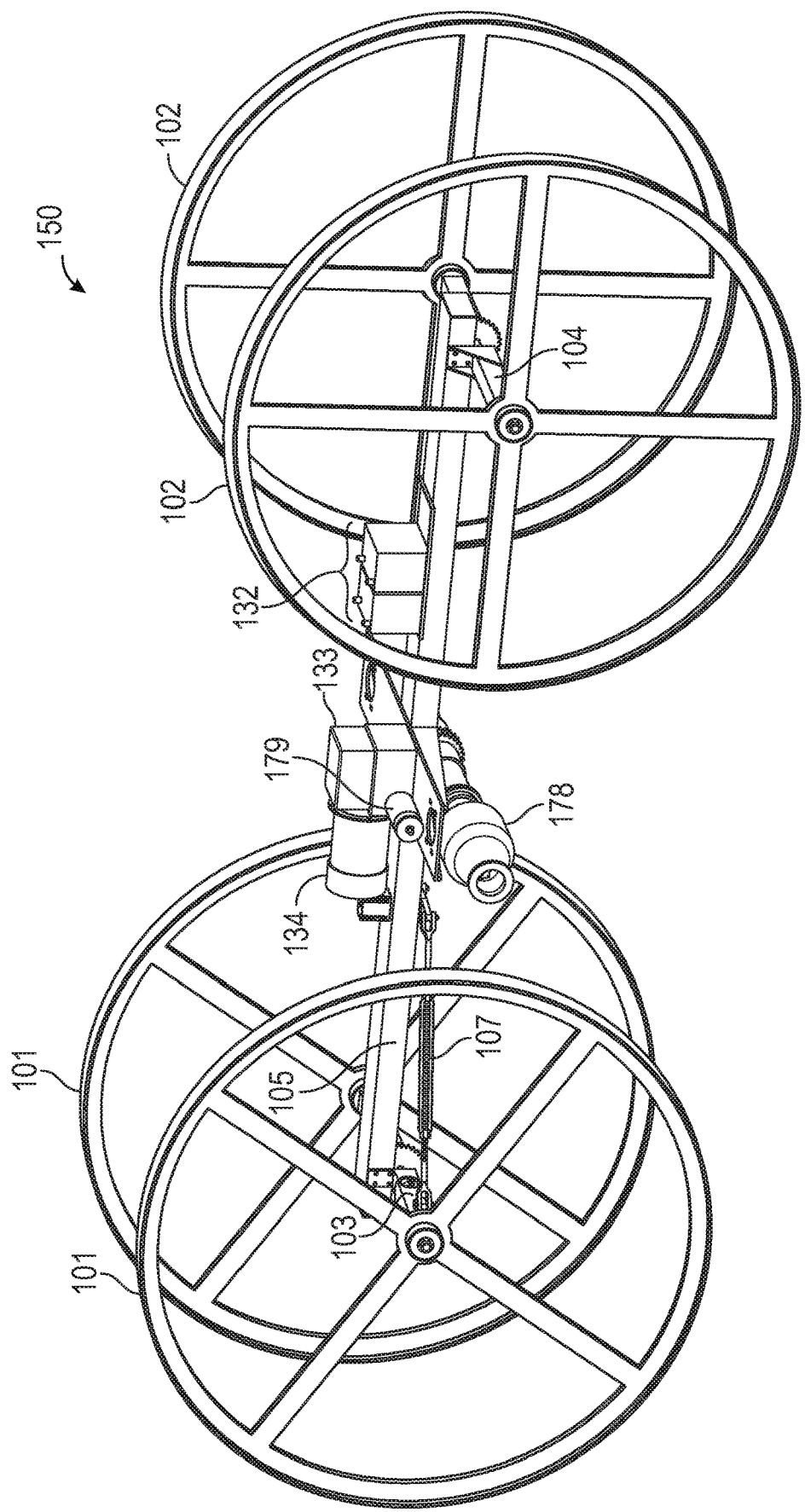
FIG. 8 shows another embodiment of the hydroelectrically-charged agricultural irrigation prime mover according to the present disclosure.

FIG. 8 illustrates a hydroelectrically-charged agricultural irrigation prime mover 150 (also referred to herein as the "prime mover 150") according to another embodiment of the present disclosure. For ease of understanding, the differences between the prime mover 100 described above and shown in FIGS. 1-7 and the prime mover 150 shown in FIG. 8 will be primarily described below. Further, the elements and components indicated by the same numerals between the prime mover 100 and the prime mover 150 indicate the same or substantially similar elements or components, and as such, repeated descriptions thereof may be omitted.

The prime mover 150 includes a hydroelectric charging system and an electric drive system, and the hydroelectric charging system is configured to power (e.g., charge) the electric drive system.

The hydroelectric charging system may include a water supply pipe (e.g., a fluid supply pipe), which has an inlet portion and an outlet portion, and a turbine 178 and hydroelectric generator 179. The turbine 178 is an in-line turbine and does not require re-routing of the pressurized fluid from the water supply pipe to generate power. The in-line turbine 178 may spin the hydroelectric generator 179 by a belt or chain drive, but the present disclosure is not limited thereto.

In FIG. 8, the in-line turbine 178 is shown as an axial flow turbine in which the water flow passes through pitched blades, which causes the blades to spin and rotate an output shaft to power the hydroelectric generator 179. In other embodiments, however, the in-line turbine 178 may be a paddlewheel turbine (see, e.g., FIG. 13) in which a plurality of paddles extend into the water flow through the water supply pipe 170, causing the paddles to spin and rotate an output shaft to power the hydroelectric generator 179. And in yet other embodiments, the in-line turbine 178 may be a spiral turbine (see, e.g., FIG. 14) in which the fluid flows in a circular path around a central shaft to spin the shaft and power the hydroelectric generator 179.

Further, similar to the prime mover 100 described above, the hydroelectric charging system of the prime mover 150 may also include a shut-off valve and shut-off valve motor configured to control the shut-off valve. By including the shut-off valve, the amount of water lost from the water supply pipe 11 while the prime mover 150 is switched from being connected to one mainline water outlet to another mainline water outlet is reduced, thereby improving efficiency and reducing the time required to re-energize the water supply pipe 11 after being connected to the next mainline water outlet.

Similar to the prime mover 100 described above, the hydroelectric generator 179 may be powered by the in-line turbine 178 to charge the battery pack 132, which may power the motor 133 and gearbox 134 of the electric drive system.

The prime mover 150 may be used in the mobile agricultural irrigation system 10 in place of, or in addition to, the prime mover 100.

Similar to the prime mover 100 described above, relevant components of the hydroelectric charging system of the prime mover 150 may be rearranged to accommodate water flow from the other side of the prime mover 150, or the prime mover 150 may operate bi-directionally to accommodate water flow from either side thereof without rearranging components of the prime mover 150.

Figure 9:
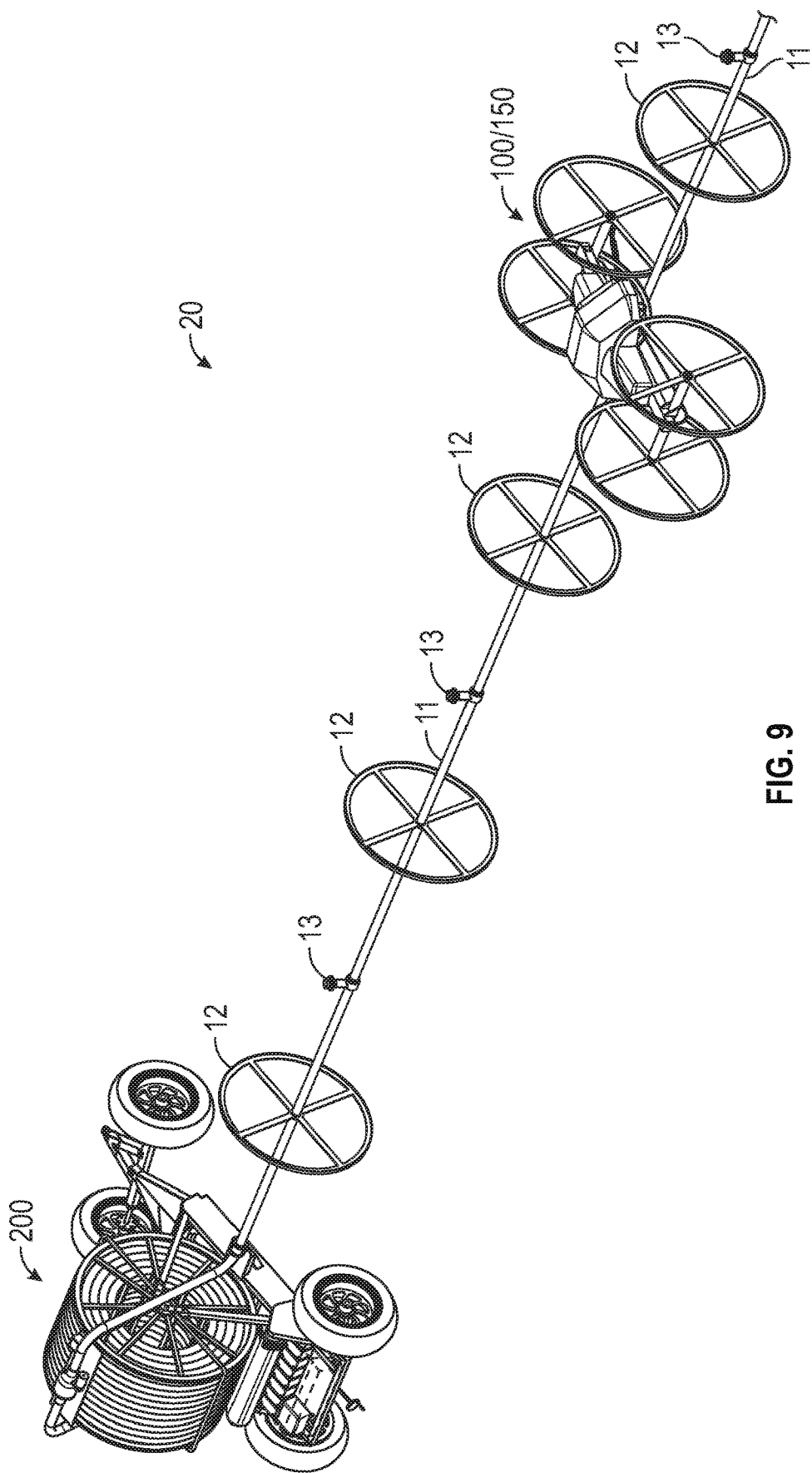
FIG. 9 is a schematic illustration of a mobile agricultural irrigation system according to another embodiment of the present disclosure.

Referring to FIG. 9, a mobile agricultural irrigation system 20 according another embodiment of the present disclosure is schematically illustrated. The mobile agricultural irrigation system 20 is similar to the mobile agricultural irrigation system 10 shown in FIG. 1 but also includes a hydroelectrically-charged agricultural hose reel prime mover 200 (also referred to herein as the "hose reel prime mover 200").

In the mobile agricultural irrigation system 20, the hose reel prime mover 200, described in more detail below, is provided at one end of the water supply pipe (e.g., the fluid supply pipe) 11 and the prime mover 100/150, embodiments of which are described above, is provided along the length of the water supply pipe 11. For example, the prime mover 100/150 may be arranged about two-thirds of the distance of the water supply pipe 11 away from the hose reel prime mover 200. To ensure water (or fluid) flow through the prime mover 100/150 to allow its hydroelectric charging system to operate, an additional length of water supply pipe 11 (e.g., about one-third the total length of the water supply pipe 11) is provided past the prime mover 100/150 away from the hose reel prime mover 200 with a sprinkler 13 at the distal end of the water supply pipe 11. However, this configuration and/or arrangement of components is just an example. In other embodiments, the hose reel prime mover 200 and/or the prime mover 100/150 may be arranged between sections of the water supply pipe 11, and a plurality of hose reels 200 and/or prime movers 100/150 may be provided.

In the mobile agricultural irrigation system 20, the hose reel prime mover 200 may be considered the "master" prime mover and the prime mover 100/150 may be considered the "slave" prime mover. For example, as described in more detail below, the hose reel prime mover 200 may control (e.g., command) the prime mover 100/150 via, for example, a wired or wireless connection, such that the prime mover 100/150 is a slave to the hose reel prime mover 200. The present disclosure, however, is not limited to this arrangement. In other embodiments, the mobile agricultural irrigation system 20 may omit the prime mover 100/150 such that the hose reel prime mover 200 is the only prime mover, or the mobile agricultural irrigation system 20 may include a plurality of hose reel prime movers 200 such that one of the hose reel prime movers 200 is the master prime mover and the other hose reel prime movers 200 are slave prime movers. In yet other embodiments, the prime mover 100/150 may be the master prime mover, and the hose reel prime mover 200 may be the slave prime mover.

As described above, the water supply pipe 11 may be fixedly connected to a plurality of wheels 12 and may act as an axle for the wheels 12. A plurality of sprinklers 13 may be arranged along the water supply pipe 11. As described above, the prime mover 100/150 may rotate the water supply pipe 11, which turns the wheels 12 as they are fixedly mounted to the water supply pipe 11, to move the mobile agricultural irrigation system 20. In addition, and as described in more detail below, the hose reel prime mover 200 may include an electric drive system (e.g., an electric drivetrain) to propel itself, which in turn, moves the water supply pipe 11 due to it being connected to the hose reel prime mover 200. As the mobile agricultural irrigation system 20 moves along (or across) a field, the hose reel prime mover 200 may deposit (e.g., reel-out) a flexible hose (e.g., a flexible water hose), which may be a quarter-mile or longer. Thus, different from the mobile agricultural irrigation system 10 described above, which may need to be stopped, de-energized, disconnected from one mainline water outlet in the field, connected to another mainline water outlet, and re-energized, which may need to occur about every 50 or 60 feet, the mobile agricultural irrigation system 20 according to the present embodiment may travel about a quarter-mile or more (only limited by the length of the flexible hose on the hose reel prime mover 200 and the ability for the hose reel prime mover 200 to move its own weight) before needing to tended to (e.g., to be connected to a different mainline water outlet or moved to a different field or traveling lane). Thus, the mobile agricultural irrigation system 20 requires less human interaction than other traveling irrigation systems and provides improved efficiency by reducing the amount of downtime incurred when tending to the mobile agricultural irrigation system 20.

Figure 10:
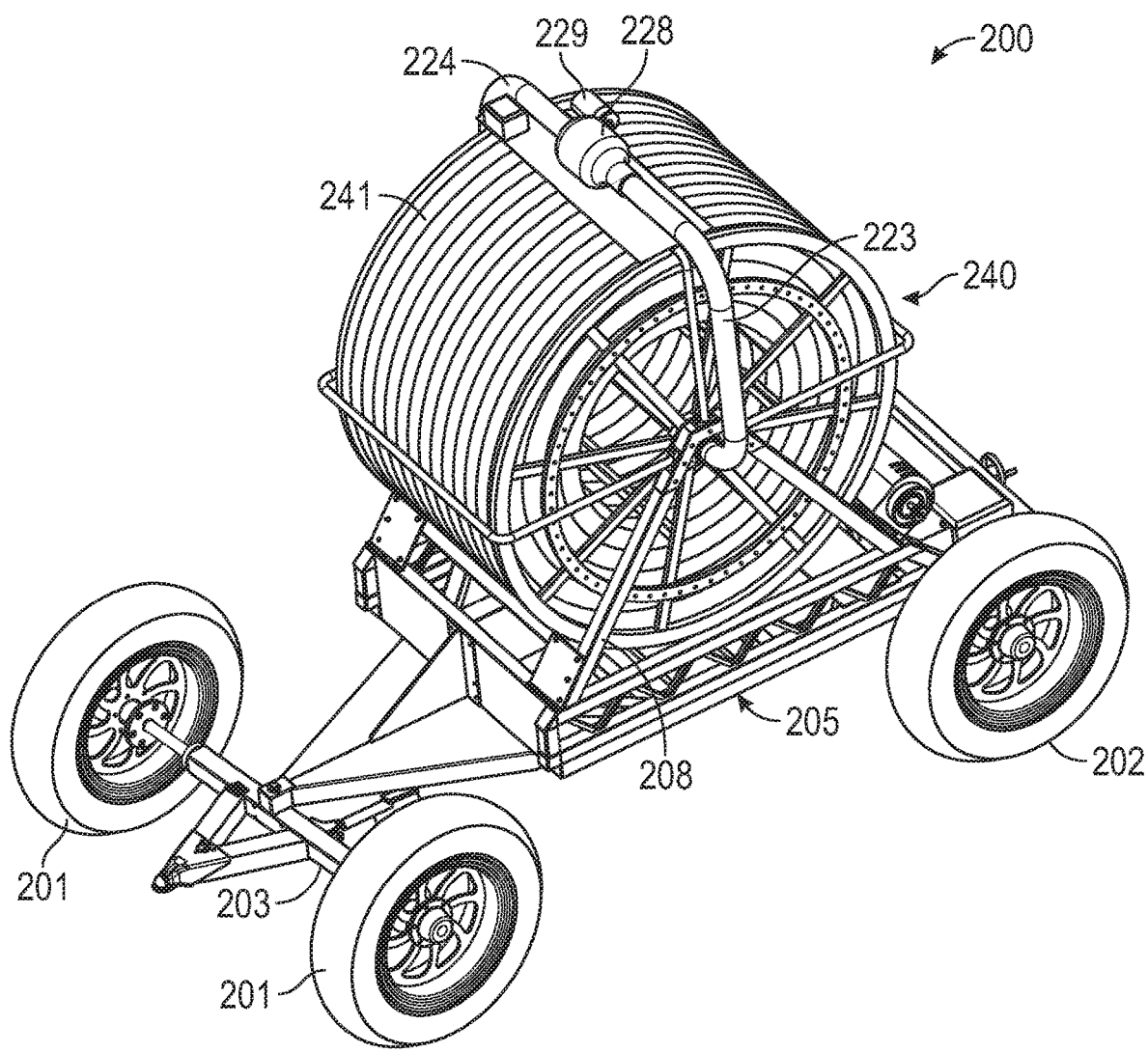
FIGS. 10-12 are schematic illustrations of the hydroelectrically-charged agricultural hose reel prime mover of the mobile agricultural irrigation system shown in FIG. 9.
Figure 11:
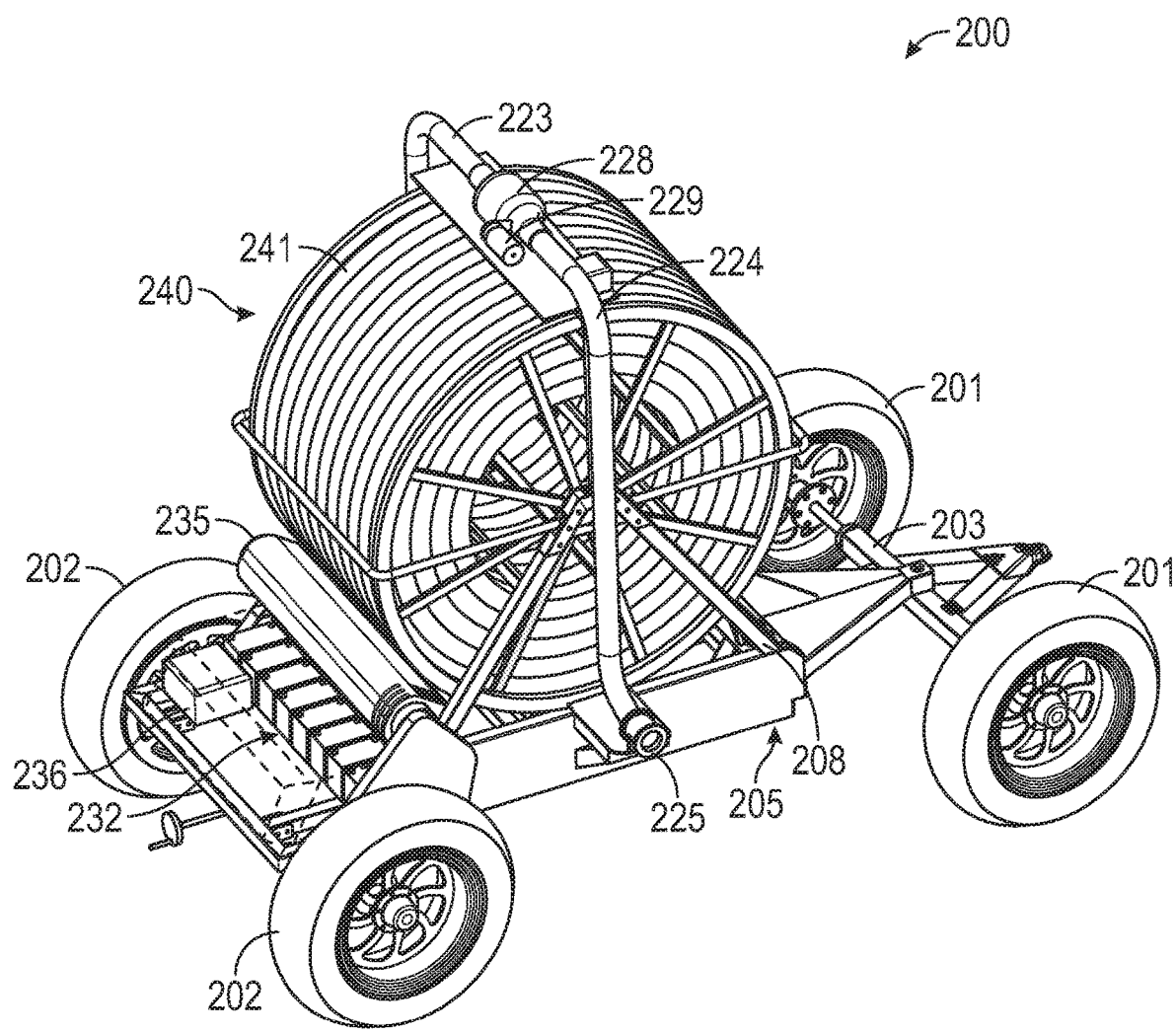
Figure 12:
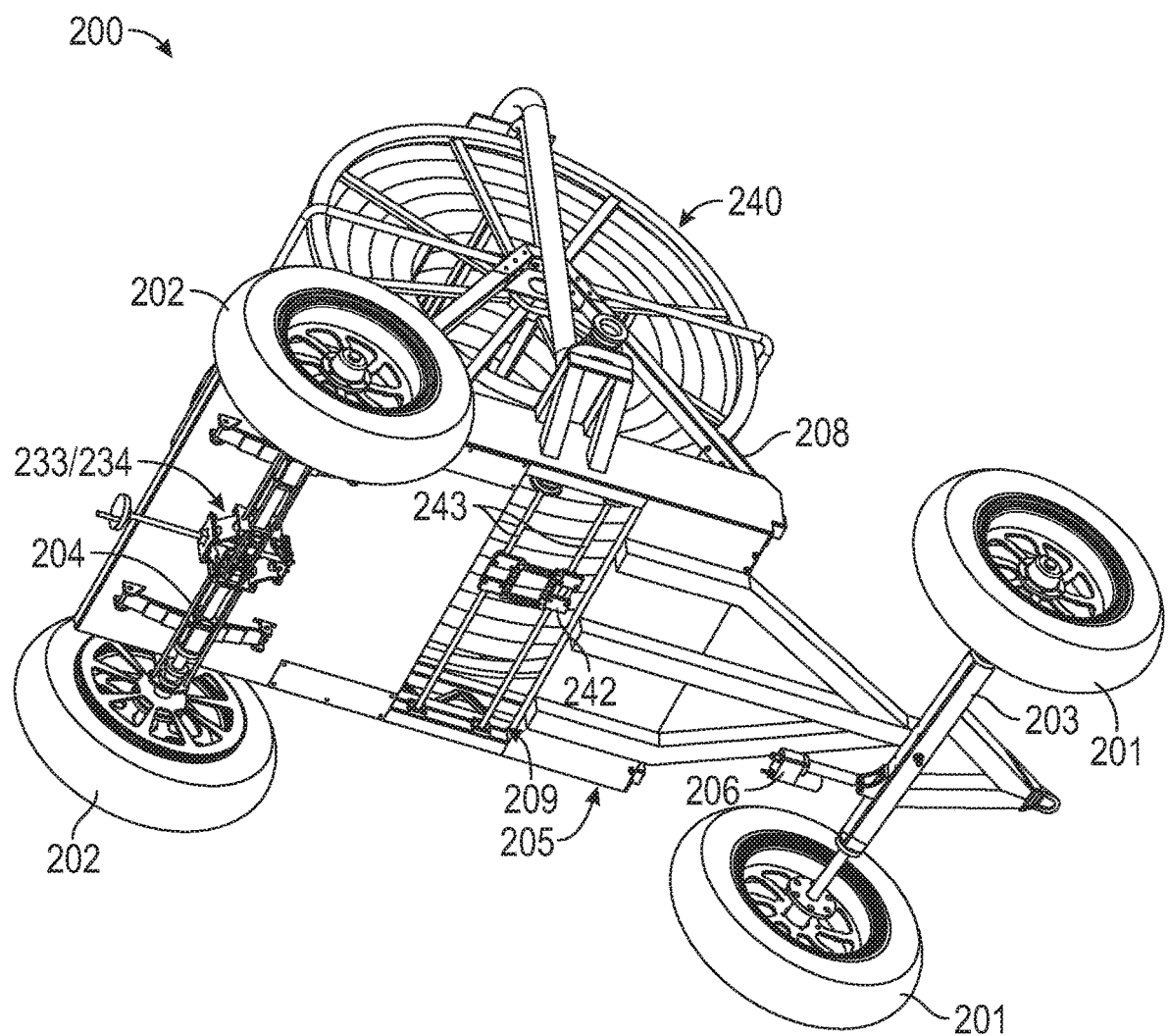

Referring to FIGS. 10-12, the hose reel prime mover 200 is described in more detail. The hose reel prime mover 200 includes a carriage (e.g., undercarriage) 205. A plurality of (e.g., two) steering wheels 201 are connected to each other via a steering axle 203, which is pivotably connected to the carriage 205, and a plurality of (e.g., two) non-steering wheels 202 are connected to each other via a non-steering axle 204 (see, e.g., FIG. 12), which is rotatably connected to the carriage 205.

The steering axle 203 may be pivotably connected to the carriage 205, and the non-steering axle 204 may be non-pivotably mounted to the carriage 205. Bearings may be used between the carriage 205 and the axles 203/204 to permit the axles 203/204 to spin (or rotate) relative to the carriage 205. However, in other embodiments, one or both of the axles 203/204 may be fixed (e.g., non-rotatable) with the carriage 205, and the corresponding wheels 201/202 may be connected to the fixed axle by individual bearings. In yet other embodiments, the driven wheels (e.g., the non-steering wheels 202) may have individual electric motors arranged in or near the wheels such that each driven wheel is independently driven by an electric motor.

The non-steering axle 204 may be connected to the carriage 205 by a leaf spring suspension, which is a relatively simple and robust suspension system. However, the present disclosure is not limited thereto, and the carriage 205 may include different suspension systems or may not include a suspension system at all (e.g., the non-steering axle 204 may be connected to the carriage 205 without any damping system therebetween).

The hose reel prime mover 200 may further include a steering actuator (e.g., a linear actuator) 206 configured to pivot the steering axle 203 and, thereby, steer the hose reel prime mover 200.

In other embodiments, the hose reel prime mover 200 may have all-wheel steering. For example, in other embodiments, a second steering box may be included to pivot the other axle 204. In such an embodiment, the axle 204 may pivotably connected to the carriage 205. In this way, the turning radius of the hose reel prime mover 200 may be improved over an embodiment which has only a single steering axle 203.

The hose reel prime mover 200 further includes a hose spool 240 connected to and supported by the carriage 205. The hose spool 240 may be connected to the carriage 205 by a plurality of (e.g., two) a-frame supports 208. The a-frame supports 208 may include one or more bearings into which the hose spool 240 (e.g., an axle of the hose spool 240) is fitted, thereby allowing the hose spool 240 to rotate (e.g., spin) relative to the a-frame supports 208 and the carriage 205.

A flexible hose (e.g., a flexible water hose) 241 may be received by (e.g., accommodated on) the hose spool 240. The hose 241 may be received by (i.e., reeled-onto) and deposited from (i.e., reeled-out of) the hose reel prime mover 200 via an opening 209 in the carriage 205. In some embodiments, a hose director 242 may be arranged on the carriage 205 in (or over) the opening 209. The hose director 242 may ensure that the hose 241 is accurately and efficiently reeled onto and off of the hose spool 240.

Figure 14:
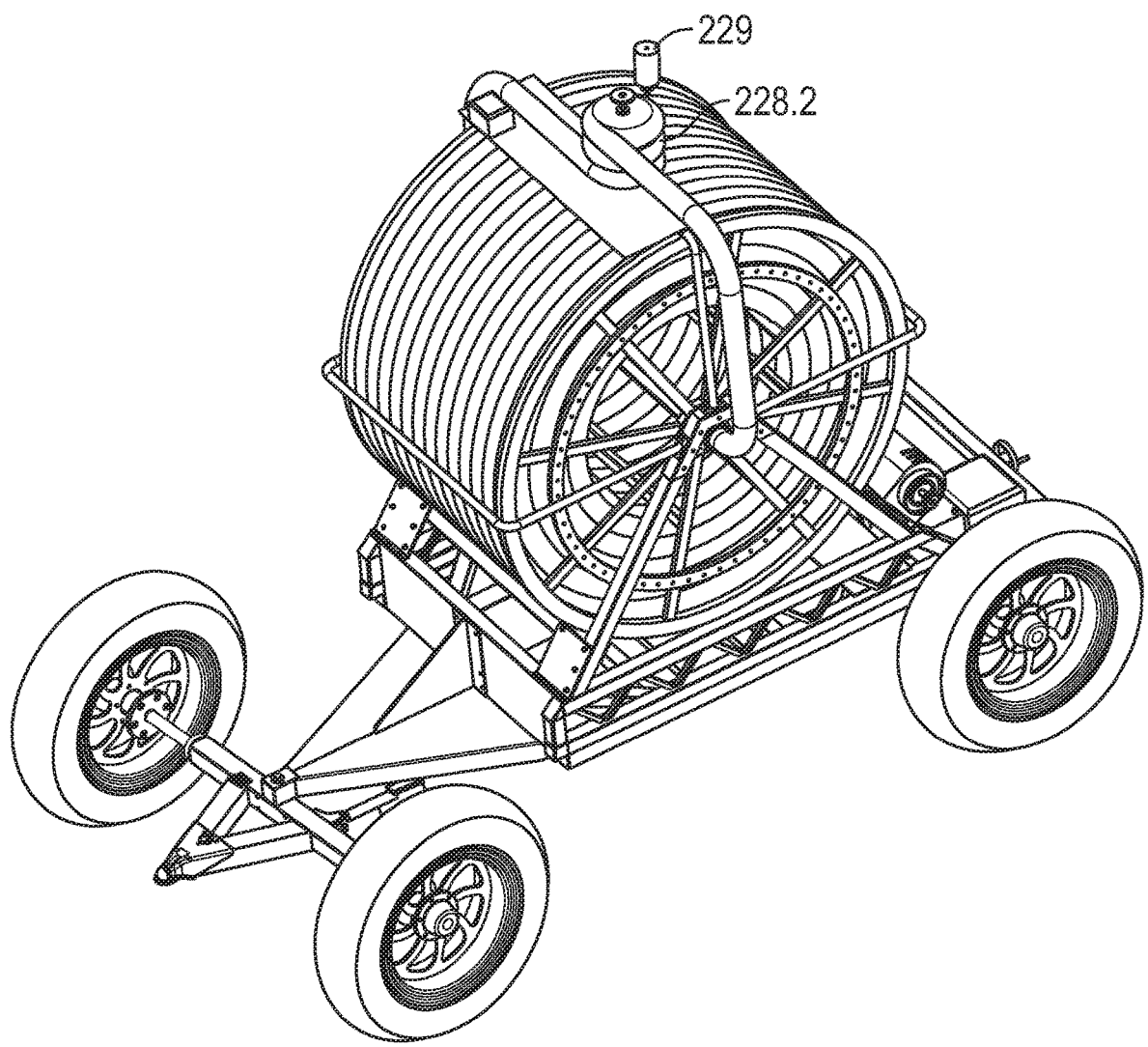

For example, the hose director 242 may move back and forth along guide rails 243 on the carriage 205 to ensure that the hose 241 is accurately and tightly arranged on the hose spool 240. As shown in FIG. 14, the hose director 242 moves back-and-forth in a linear direction perpendicular or substantially perpendicular to the traveling direction of the hose reel prime mover 200 (e.g., parallel or substantially parallel to the non-steering axle 204). The hose director 242 prevents or substantially reduces the chance that the hose 241 bunches up on one side the hose spool 240 by ensuring that the hose 241 is evenly distributed on (e.g., is evenly spooled on) the hose spool 240, thereby preventing a jam and maximizing the amount of (e.g. the length of) hose 241 that can be accommodated on the hose spool 240.

The hose director 242 may have a square or rectangular shape through which the flexible hose 241 passes. The hose director 242 may further have a plurality of wheels or rollers arranged along two or more sides thereof to ensure that the flexible hose 241 smoothly passes through the hose director 242 without damage to either the hose 241 or the hose director 242.

The hose director 242 may be moved along the guide rails 243 by any suitable drive mechanism, such as a linear actuator, such as a worm drive, rack-and-pinion, single- or double-acting cylinder, etc. As described in more detail below, the hose director 242 may be controlled by a controller.

The hose reel prime mover 200 includes a hydroelectric charging system and an electric drive system. The hydroelectric charging system is configured to power (e.g., charge) the electric drive system.

The hydroelectric charging system may include a turbine inlet pipe (e.g., a fluid supply pipe) 223, a turbine 228, a hydroelectric generator 229 powered by the turbine 228, and a turbine outlet pipe (e.g., a discharge pipe) 224. The hydroelectric generator 229 is configured to charge a battery pack 232, and the battery pack 232 may power the electric drive system, which is further described below. Further, the hydroelectric charging system of the hose reel prime mover 200 may also include a shut-off valve and shut-off valve motor configured to control the shut-off valve. The shut-off valve reduces the amount of water lost from the water supply pipe 11 and/or the flexible hose 241 when the flexible hose 241 is disconnected from the mainline water outlet, thereby improving efficiency and reducing the amount of time necessary to re-charge the hose reel prime mover 200 and the water supply pipe 11 when it is connected to another mainline water outlet.

As shown in FIGS. 10-12, the turbine 228 and hydroelectric generator 229 may be arranged on (or above) the hose reel 240 to efficiently use space, but the present disclosure is not limited thereto. In other embodiments, the turbine 228 and hydroelectric generator 229 may be arranged on (or near) the carriage 205 in front of the hose reel 240 (e.g., toward the steering axle 203). In this way, the turbine 228 and hydroelectric generator 229 may be more easily serviced and/or replaced during the lifetime of the hose reel prime mover 200. Further, cable connections between the hydroelectric generator 229 and the battery pack 232 may be more easily routed when the hydroelectric generator 229 is near the bottom of the hose spool 240.

The water flow path through the hose reel prime mover 200 will now be described in more detail. First, a first end (e.g., a distal end) of the hose 241 is attached to a mainline water outlet by a suitable fitting. This may be done manually by a worker in the field. A second end (e.g., a proximal end) of the hose 241 may be connected to the turbine inlet pipe 223. For example, the first end of the hose 241 may be the distal end of the hose 241 from the hose reel prime mover 200 and may be passed though the hose director 242 and the opening 209 in the carriage 205 to be connected to the mainline water outlet. The second end of the hose 241 may be the proximal end of the hose 241 with respect to the hose reel prime mover 200 and may be connected, either permanently or via a suitable fitting, to the turbine inlet pipe 223. For example, the second end of the hose 241 may terminate into a drum at or near a central axis of the hose spool 240.

Because the hose spool 240, on which the hose 241 is arranged, rotates relative to the turbine inlet pipe 223, which is fixed to the carriage 205, a bearing fitting is provided to connect the second end of the hose 241 (or to connect the drum into which the second end of the hose 241 terminates) and the turbine inlet pipe 223. Thus, the second end of the hose 241 (or the drum) is allowed to rotate 360° at where it connects to the turbine inlet pipe 223.

Pressurized water from the mainline water outlet passes through the hose 241 (e.g., passes through the entire hose 241) to the turbine inlet pipe 223. The pressurized water passes through the turbine inlet pipe 223, into and through the turbine 228, and then to the turbine outlet pipe 224. As the pressurized water passes through the turbine 228, it causes an output shaft to rotate, which is connected to and powers the hydroelectric generator 229. The hydroelectric generator 229 generates an electrical current, which is then stored by the battery pack 232.

The pressurized water then passes from the turbine outlet pipe 224 to the water supply pipe 11 of the mobile agricultural irrigation system 20 by, for example, a bearing connection 225 (see, e.g., FIGS. 9 and 11). Because the water supply pipe 11 rotates, the bearing connection 225 is provided between the turbine outlet pipe 224, which is fixed to the carriage 205, and the water supply pipe 11 to allow for a fluid tight connection between the fixed turbine outlet pipe 224 and the rotatable water supply pipe 11. The present disclosure, however, is not limited to this example. As described below, in other embodiments (see, e.g., FIGS. 15-19), the turbine outlet pipe 224 may connect to a nozzle through which the pressurized water is expelled to water a large area of a field, thereby providing a self-contained traveling gun irrigation system.

The turbine 228 may be an in-line turbine. In the embodiment shown in FIGS. 10-12, the turbine 228 is an axial flow turbine in which the water flow passes through pitched blades, which causes the blades to spin and rotate an output shaft to power the hydroelectric generator 229 by a belt or chain drive. However, the present disclosure is not limited thereto.

Figure 13:
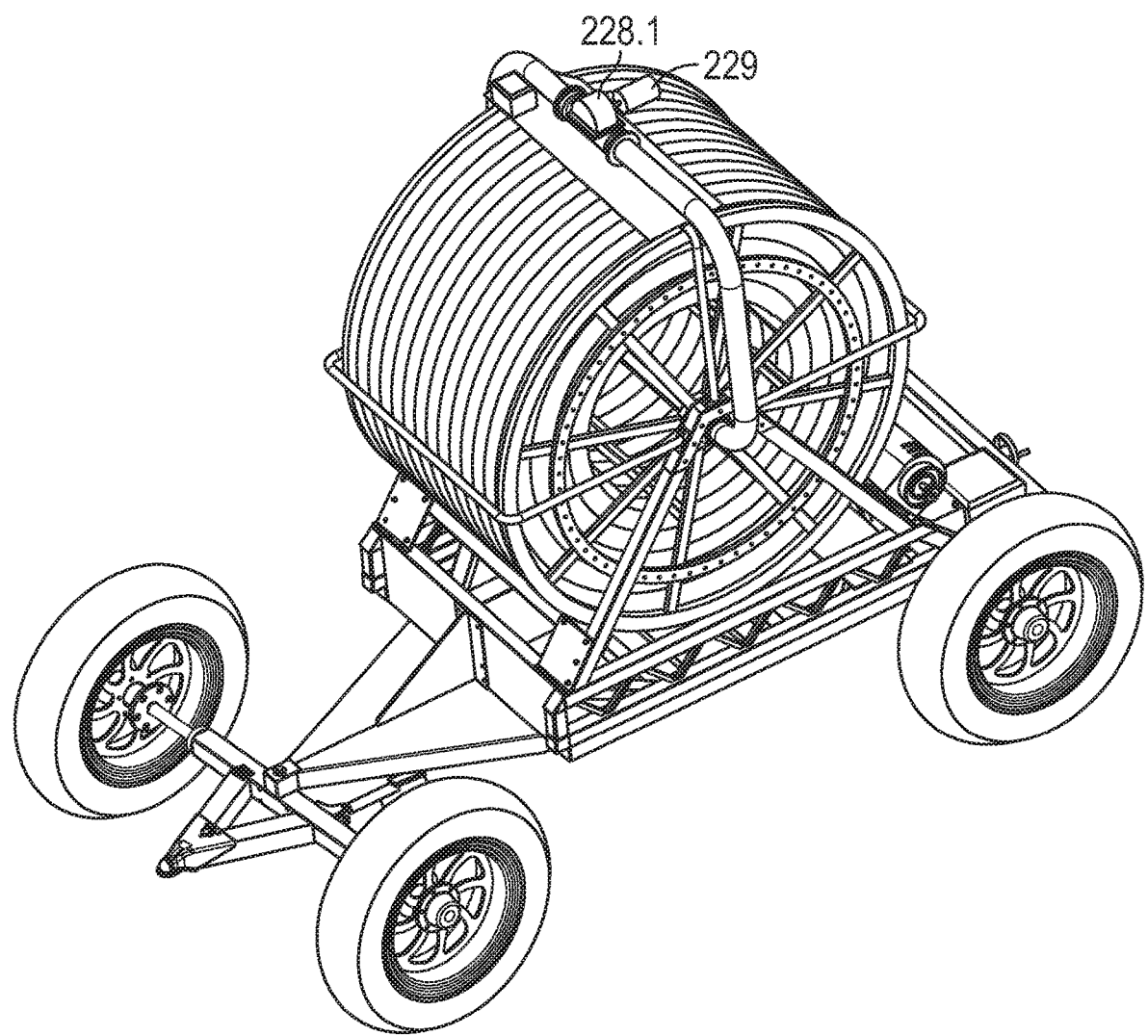
FIGS. 13 and 14 are schematic illustrations of the hydroelectrically-charged agricultural hose reel prime mover according to other embodiments of the present disclosure.

In FIG. 13, the turbine 228.1 is a paddlewheel turbine in which a plurality of paddles protrude into the pressurized water flow, causing the paddles to spin and rotate an output shaft to power the hydroelectric generator 229.

In FIG. 14, the turbine 228.2 is a spiral flow turbine in which the pressured water flow flows in a circular pattern around a turbine to spin the turbine and power the hydroelectric generator 229.

The hose reel prime mover 200 may also include a controller 236 (see, e.g., FIG. 11) to control the electric drive system, the hydroelectric charging system, and/or the steering box 206. The controller 236 may be powered by the battery pack 232. In other embodiments, the controller 236 may be powered by an independent power supply.

The controller 236 may also include (or may communicate with) a transceiver configured for two-way wireless radio communication. As described above, by using the transceiver, the hose reel prime mover 200 may report its position, current operating status, state of charge of the battery pack 232, etc. to a central operating platform, thereby enabling one worker or a central controller to remotely monitor and/or control a plurality of the prime movers 100/150 and/or the hose reel prime movers 200.

The electric drive system of the hose reel prime mover 200 will now be described in more detail. The electric drive system may include the battery pack 232, a first motor (e.g., a drive motor) 233 and a second motor (e.g., hose spool motor) 235. The first motor 233 and the second motor 235 may be electrically connected to the battery pack 232. Further, the drive system for the hose director 242 may be part of the electric drive system. For example, when a hydraulic cylinder is used to move the hose director 242, the electric drive system may include a pump (e.g., a hydraulic pump) and associated valves to control the hydraulic cylinder. In other embodiments, when a linear actuator, worm drive, or rack-and-pinion system is used to move the hose director 242, the electric drive system may include a third motor (e.g., a hose director motor) to control the linear actuator, worm drive, or rack-and-pinion system.

The first motor 233 is mechanically connected to a gearbox 234, and the gearbox 234 is connected to the non-steering axle 204 to drive (e.g., to rotate) the non-steering axle 204. As some examples, a chain drive system including a plurality of sprockets or a belt drive system including a plurality of pulleys may be used between the first motor 233 and the non-steering axle 204.

The second motor (e.g., the hose spool motor) 235 is connected to the hose spool 240 to rotate the hose spool 240. For example, a belt drive system including a belt and pullies or a chain drive system including a chain and sprockets may be used to rotate the hose spool 240. As will be further described below, the second motor 235 may rotate the hose spool 240 according to (e.g., in sync with) the movement speed of the hose reel prime mover 200, for example, according to (e.g., in sync with) the speed of the first motor 233, to reel-in or reel-out the hose 241 at a suitable speed (or rate). By including the second motor 235 to reel-in or reel-out the hose 241, load on the first motor 233 is reduced as it does not have to move the hose reel prime mover 200 and reel-out the hose 241 from the hose spool 240 and allows for the hose reel prime mover 200 to move back down its traveling path to reel-in the hose 241 after completing a set.

Movement of the hose reel prime mover 200 will now be described in more detail. When the hose reel prime mover 200 is commanded to move, the first motor 233, which is powered by energy stored in the battery pack 232, rotates an output shaft which turns the gearbox 234. The gearbox 234 then rotates the non-steering axle 204, thereby driving the wheels 202 and moving the hose reel prime mover 200 (e.g., moving the carriage 205 of the hose reel prime mover 200).

As the hose reel prime mover 200 moves, the second motor 235 rotates the hose spool 240 to either reel-in the hose 241 (when the hose 241 starts in reeled-out configuration) or reel-out the hose 241 (when the hose 241 starts reeled onto the hose spool 240). The rotational speed of the hose spool 240 is controlled by the controller 236 to be in sync with the movement speed of the hose reel prime mover 200. In this way, the hose 241 is not reeled-out or reeled-in too slowly or too quickly, which would increase wear on the hose reel prime mover 200 and on the hose 241.

Further, the rotational speed of the hose reel 240 must be varied as the amount of hose 241 is reeled-in or reeled-out. Using a reel-out situation as an example, the effective circumference of the hose reel 240 decreases as the amount of hose 241 is reeled-out; thus, even when the movement speed of the hose reel prime mover 200 remains constant or relatively constant, the rotational speed of the hose reel 240 must increase to maintain the same reel-out rate of the hose 241. Conversely, in a reel-in situation, the effective circumference of the hose reel 240 increases as the hose 241 is reeled-in due to the hose 241 stacking on itself in layers; thus, even as the movement speed of the hose reel prime mover 200 remains constant or substantially constant, the rotational speed of the hose spool 240 must decrease over time to maintain the same reel-in rate of the hose 241.

As the second motor 235 rotates the hose spool 240, the hose director 242 moves back and forth in sync with the rotational speed of the hose spool 240 and/or in sync with the movement speed of the hose reel prime mover 200 to ensure that the hose 241 is tightly and efficiently reeled onto the hose spool 240 or is efficiently reeled off of the hose spool 240.

Thus, the hose reel prime mover 200 according to embodiments of the present disclosure effectively operates in both the reel-in and reel-out directions. Thus, as one example, the hose reel prime mover 200 could repeatedly pass back-and-forth along a section of field without requiring human interaction.

Figure 15:
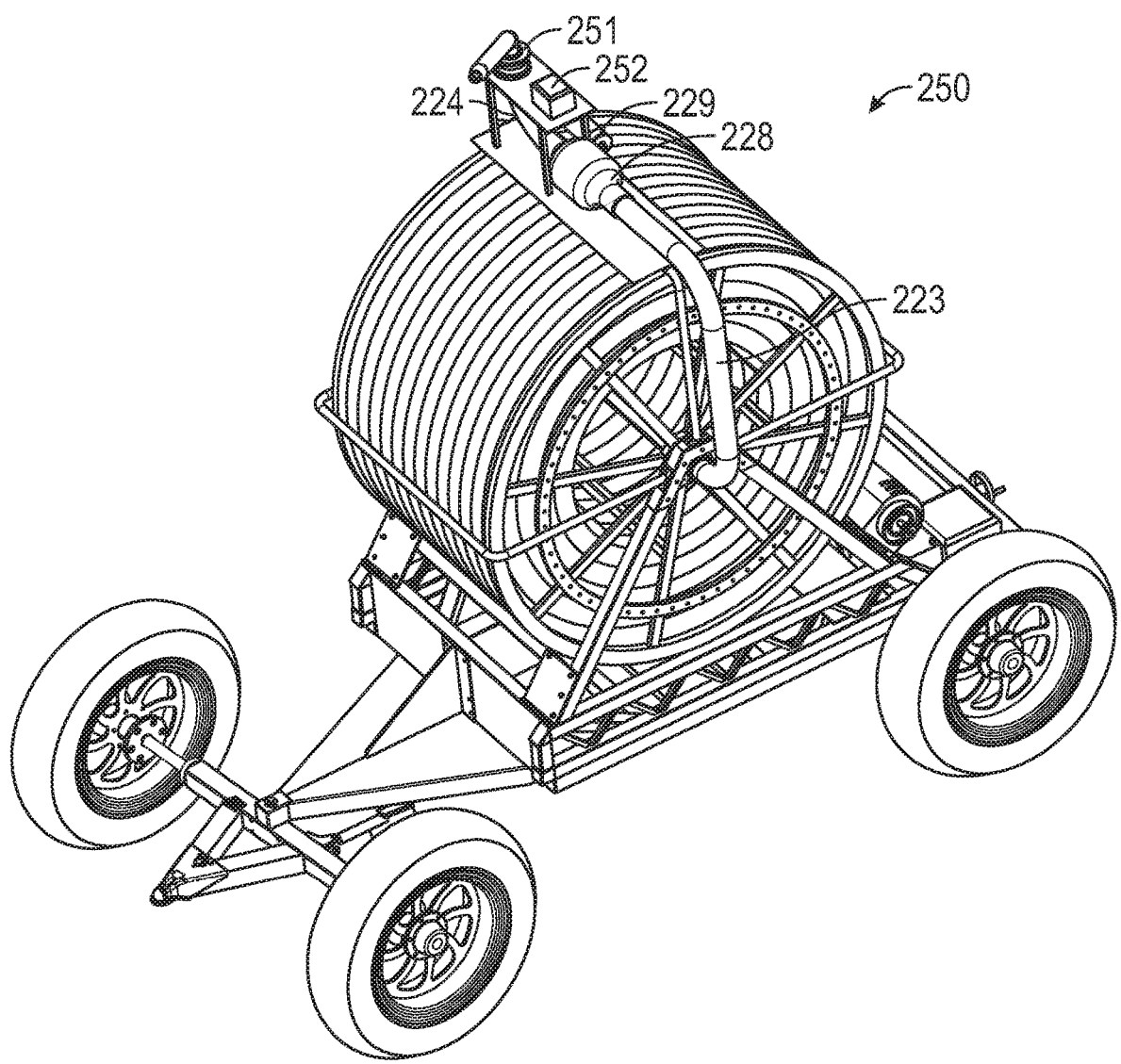
FIGS. 15-17 are schematic illustrations of a hydroelectrically-charged agricultural traveling gun prime mover.
Figure 16:
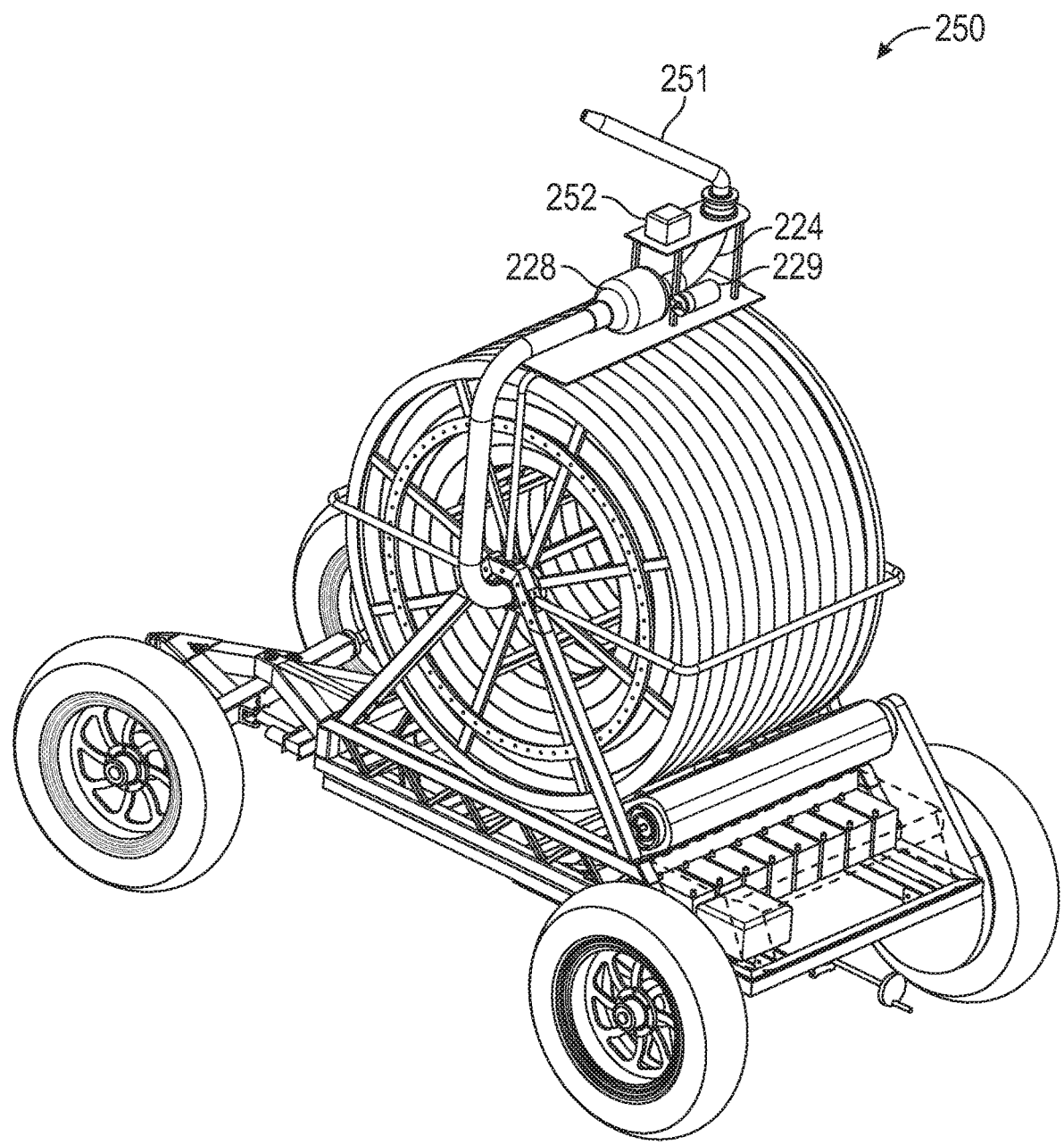
Figure 17:
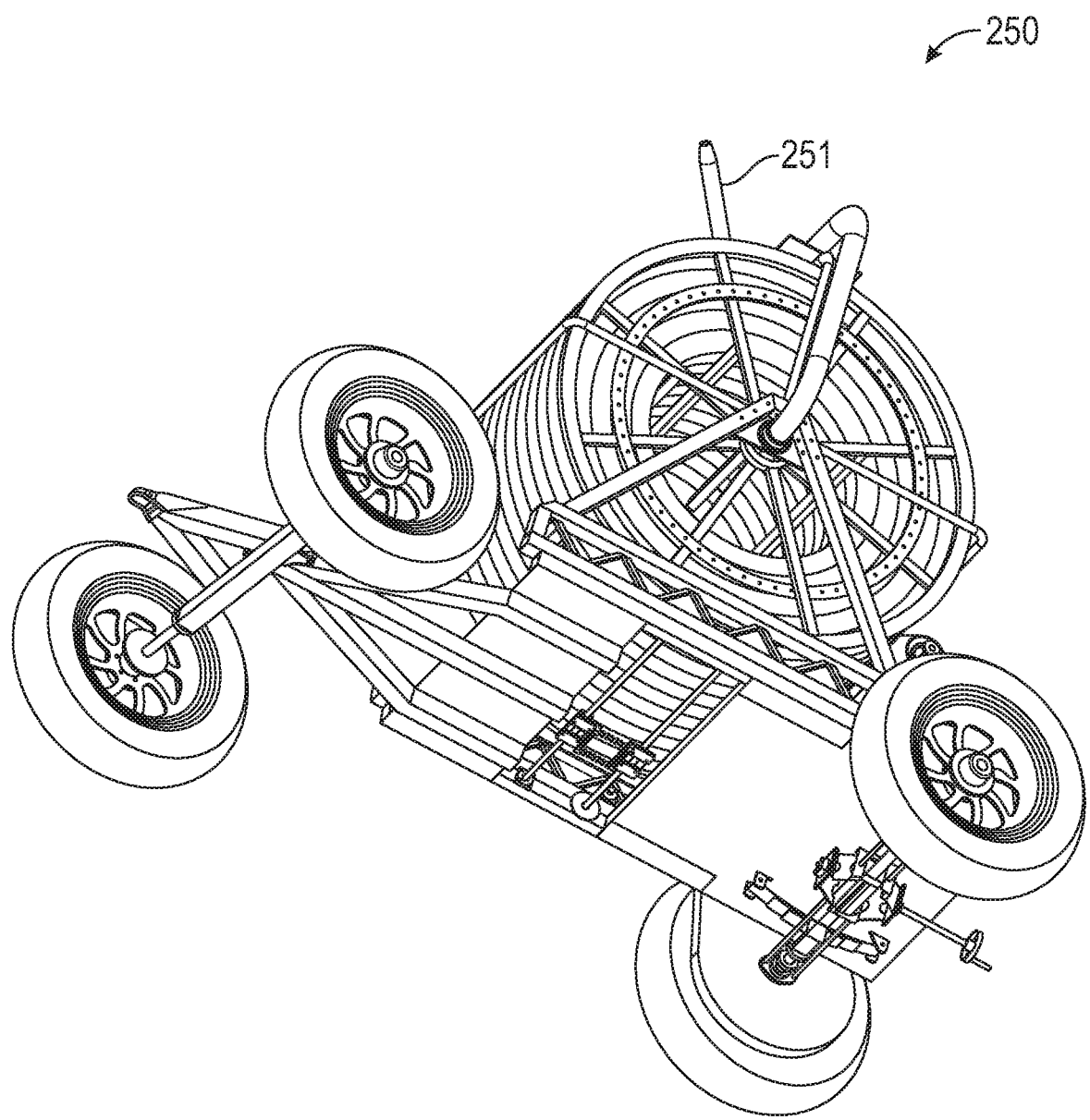
Figure 18:
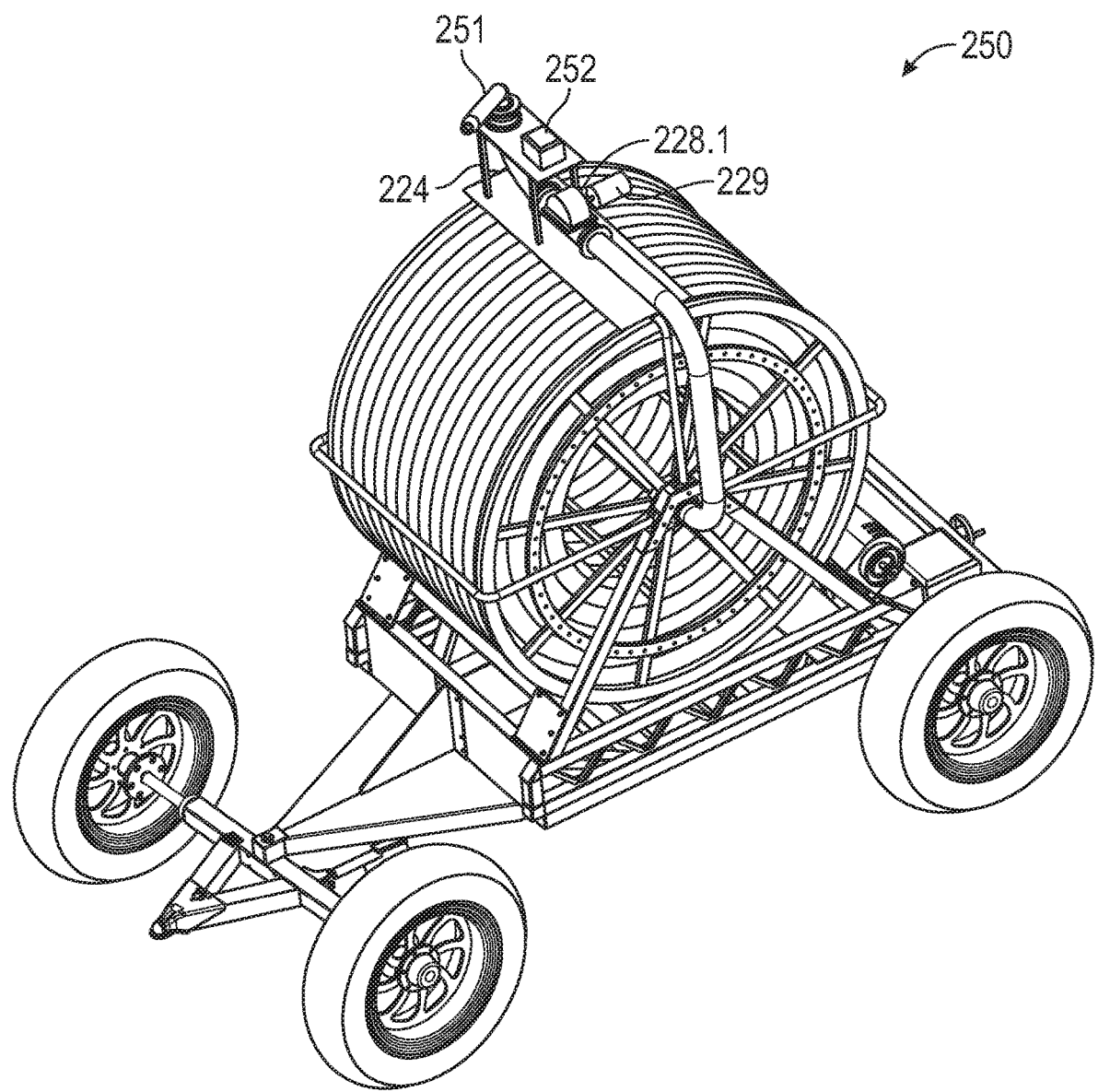
FIGS. 18 and 19 are schematic illustrations of the hydroelectrically-charged agricultural traveling gun prime mover according to other embodiments of the present disclosure.

FIGS. 15-17 show an embodiment of a hose reel traveling gun 250. For ease of understanding, the differences between the hose reel prime mover 200 described above and the hose reel traveling gun 250 will be primarily described below. Further, the elements and components indicated by the same numerals between the hose reel prime mover 200 and the hose reel traveling gun 250 indicate the same or substantially similar elements or components, and as such, repeated descriptions thereof may be omitted.

Different from the hose reel prime mover 200, the hose reel traveling gun 250 is a self-contained irrigation device. For example, instead of passing pressurized water to the water supply pipe 11 as with the hose reel prime mover 200, the hose reel traveling gun 250 includes a nozzle 251 connected to the turbine outlet pipe 224 to discharge the pressurized water to irrigate a field. For example, similar to the hose reel prime mover 200, the pressurized water from a mainline water outlet passes through the hose 241, to the turbine inlet pipe 223, through the turbine 228 to power the hydroelectric generator 229 and charge the battery pack 232, and to the turbine outlet pipe 224. Different from the hose reel prime mover 200, in the hose reel traveling gun 250, the pressurized water in the turbine outlet pipe 224 flows to and exits the hose reel traveling gun 250 via the nozzle 251.

The nozzle 251 may be rotated 180°, 360°, or any suitable range during use to evenly irrigate a field as the carriage 205 moves along a traveling lane in a field. In some embodiments, the nozzle 251 may be an impact sprinkler and may be rotated via the pressurized water passing therethrough. In other embodiments, a motor 252 may be included adjacent to the nozzle 251 to rotate the nozzle 251 by, for example, a belt or chain drive. The motor (e.g., a stepper motor) 252 may be powered by the battery pack 232 and may include a belt or chain drive system to rotate the nozzle 251. The speed and direction of the motor 252 may be controlled to vary the rotational speed and coverage area of the nozzle 251. The motor 252 may be controlled by the controller 236.

The hose reel traveling gun 250 may be a self-contained irrigation system in that it both moves and irrigates. For example, in use, the hose reel traveling gun 250 may move by the first motor 233, the hose reel 240 may rotate by the second motor 235, the hose director 242 may direct the hose 241 onto or off of the hose reel 240, and the pressurized water is emitted via the nozzle 251 to directly irrigate a field without using the wheel line irrigation system as in the previously-described embodiments.

Figure 19:
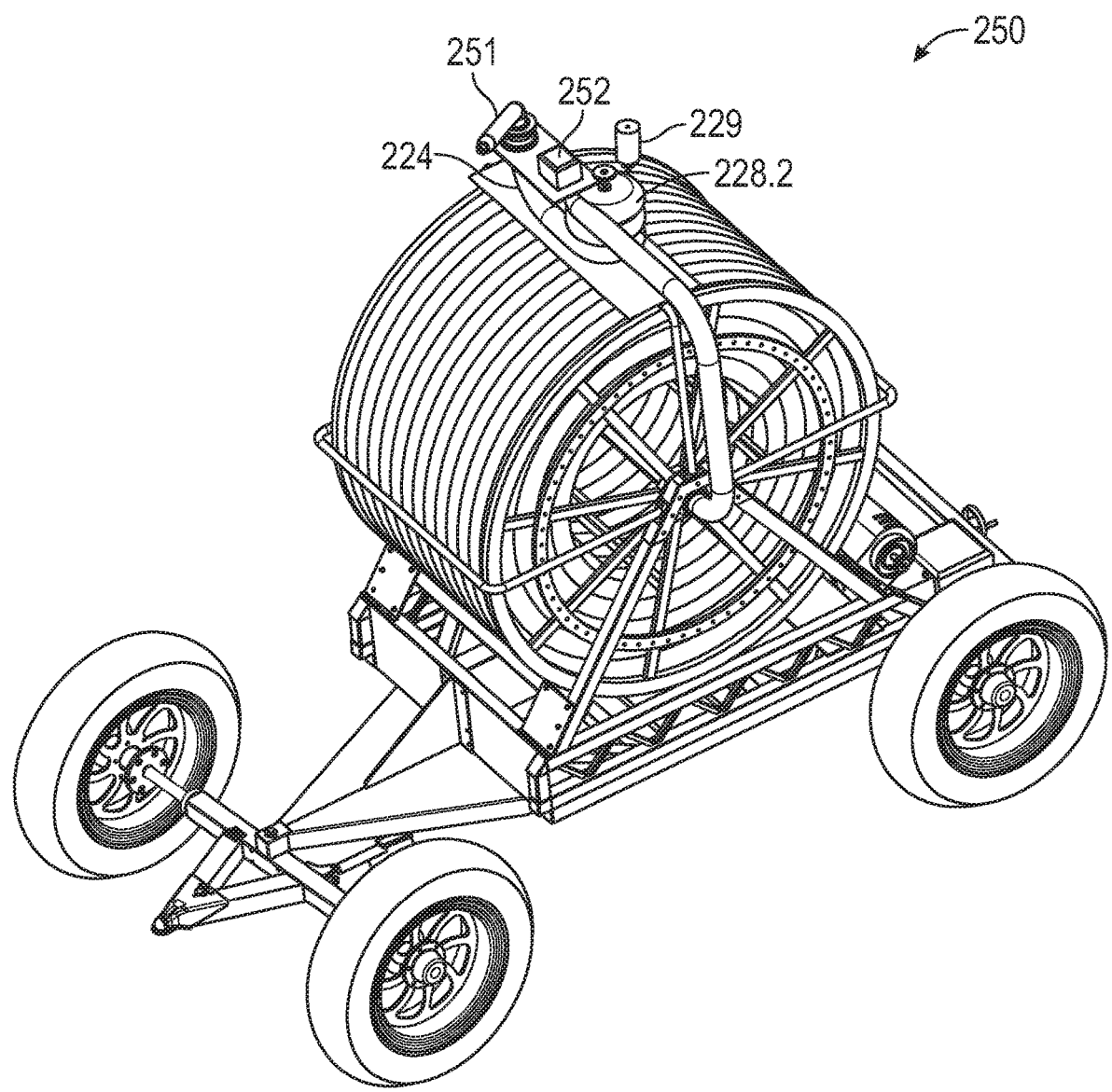

Further, similar to the embodiments of the hose reel prime mover 200 shown in FIGS. 13 and 14, the turbine 228 of the hose reel traveling gun 250 shown in FIGS. 15-17 may be not only an axial flow turbine (see, e.g., FIG. 17) but may be a paddlewheel turbine 228.1 (see, e.g., FIG. 18) or a spiral flow turbine 228.2 (see, e.g., FIG. 19).

Although the present disclosure has been described with reference to the example embodiments, those skilled in the art will recognize that various changes and modifications to the described embodiments may be made, all without departing from the spirit and scope of the present disclosure. Furthermore, those skilled in the various arts will recognize that the present disclosure described herein will suggest solutions to other tasks and adaptations for other applications. It is the applicant's intention to cover, by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims and their equivalents.

What is claimed is:

1. A hydroelectrically-charged agricultural irrigation prime mover comprising:
a carriage;
a plurality of wheels coupled to the carriage;
a fluid supply pipe configured to receive a pressurized fluid;
an electric drive system comprising:
a battery pack; and
a motor electrically connected to the battery pack and configured to rotate at least some of the wheels and the fluid supply pipe; and
a hydroelectric charging system comprising:
a turbine fluidly connected to the fluid supply pipe to receive at least some of the pressurized fluid; and
a hydroelectric generator connected to the turbine, the hydroelectric generator being configured to charge the battery pack.

2. The hydroelectrically-charged agricultural irrigation prime mover of claim 1, wherein the turbine is an in-line turbine.

3. The hydroelectrically-charged agricultural irrigation prime mover of claim 1, further comprising a steering axle and a non-steering axle, each of the steering axle and the non-steering axle having a plurality of the wheels connected thereto.

4. The hydroelectrically-charged agricultural irrigation prime mover of claim 3, wherein the motor is configured to simultaneously rotate the fluid supply pipe and the non-steering axle.

5. A hydroelectrically-charged agricultural irrigation prime mover comprising:
a carriage;
a hose reel rotatably connected to the carriage;
a plurality of wheels coupled to the carriage;
a fluid supply pipe configured to receive a pressurized fluid;
an electric drive system comprising:
a battery pack; and
a motor electrically connected to the battery pack and configured to rotate at least some of the wheels; and
a hydroelectric charging system comprising:
a turbine fluidly connected to the fluid supply pipe to receive at least some of the pressurized fluid; and
a hydroelectric generator connected to the turbine, the hydroelectric generator being configured to charge the battery pack.

6. The hydroelectrically-charged agricultural irrigation prime mover of claim 5, further comprising a second motor electrically connected to the battery pack, the second motor being configured to rotate the hose reel.

7. The hydroelectrically-charged agricultural irrigation prime mover of claim 6, further comprising a flexible hose on the hose reel,
wherein the carriage has an opening therein through which one end of the flexible hose passes.

8. The hydroelectrically-charged agricultural irrigation prime mover of claim 7, further comprising a hose director configured to move back-and-forth across the opening in the carriage and to direct the flexible hose through the opening.

9. The hydroelectrically-charged agricultural irrigation prime mover of claim 8, further comprising a linear actuator to move the hose director.

10. The hydroelectrically-charged agricultural irrigation prime mover of claim 8, further comprising a double-acting cylinder to move the hose director.

11. The hydroelectrically-charged agricultural irrigation prime mover of claim 7, wherein the turbine is above the hose reel with respect to the carriage.

12. The hydroelectrically-charged agricultural irrigation prime mover of claim 11, further comprising a nozzle connected to an outlet of the turbine.

13. The hydroelectrically-charged agricultural irrigation prime mover of claim 11, further comprising a fitting connected to an outlet of the turbine.

14. A mobile agricultural irrigation system comprising:
a water supply pipe comprising a plurality of wheels and sprinklers arranged along a length of the water supply pipe; and
a hose reel prime mover connected to a proximal end of the water supply pipe, the hose reel prime mover comprising:
an electric drive system comprising a battery pack and a first motor electrically connected to the battery pack, the first motor being configured to move the hose reel prime mover; and
a hydroelectric charging system comprising a turbine configured to be powered by a pressurized fluid and a hydroelectric generator powered by the turbine and configured to charge the battery pack.

15. The mobile agricultural irrigation system of claim 14, wherein the hose reel prime mover further comprises a hose reel on which a flexible hose is arranged, and wherein the electric drive system of the hose reel prime mover further comprises a second motor electrically connected to the battery pack and configured to rotate the hose reel.

16. The mobile agricultural irrigation system of claim 15, wherein the hose reel prime mover further comprises a hose director configured to move back-and-forth to direct the flexible hose onto and off of the hose reel.

17. The mobile agricultural irrigation system of claim 16, wherein the hose reel prime mover further comprises a third motor electrically connected to the battery pack and configured to move the hose director.

18. The mobile agricultural irrigation system of claim 16, wherein the hose reel prime mover further comprises a controller, the controller being configured to control a rotational speed of the hose reel in coordination with a movement speed of the hose director and a movement speed of the hose reel prime mover.

19. The mobile agricultural irrigation system of claim 14, further comprising a second prime mover connected along the water supply pipe at a distance from the hose reel prime mover and at a distance from a distal end of the water supply pipe,
wherein the second prime mover comprises an electric drive system and a hydroelectric charging system configured to power the electric drive system.

* * * * *